March 7, 1944.　　A. H. DICKINSON　　2,343,370
ACCOUNTING MACHINE
Filed Dec. 9, 1939　　11 Sheets-Sheet 2

INVENTOR
Arthur H. Dickinson
BY
ATTORNEYS

March 7, 1944.     A. H. DICKINSON     2,343,370
ACCOUNTING MACHINE
Filed Dec. 9, 1939     11 Sheets-Sheet 3

INVENTOR
Arthur H. Dickinson
BY
ATTORNEYS

March 7, 1944.　　　A. H. DICKINSON　　　2,343,370
ACCOUNTING MACHINE
Filed Dec. 9, 1939　　　11 Sheets-Sheet 4

INVENTOR.
Arthur H. Dickinson
BY
ATTORNEYS.

March 7, 1944. A. H. DICKINSON 2,343,370
ACCOUNTING MACHINE
Filed Dec. 9, 1939 11 Sheets-Sheet 5
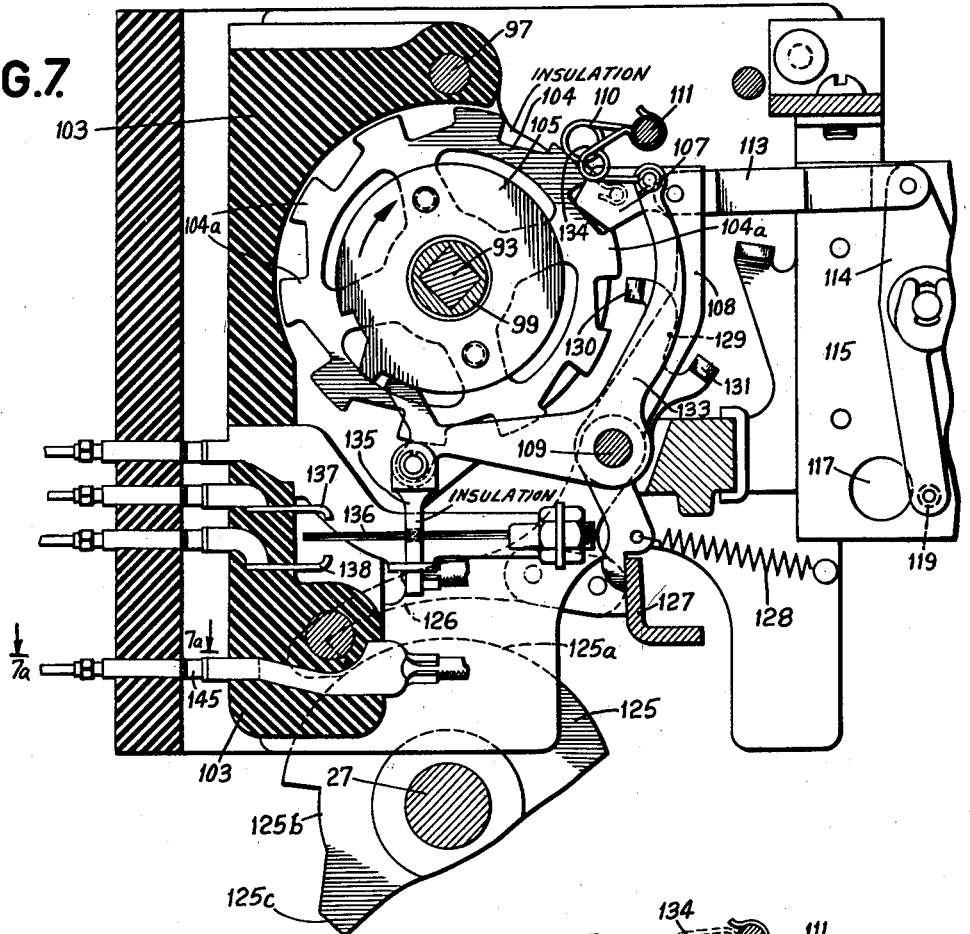
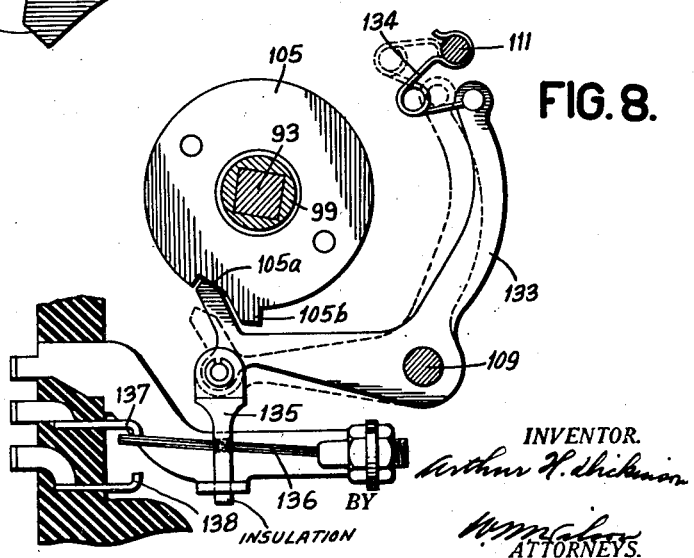

March 7, 1944. A. H. DICKINSON 2,343,370
ACCOUNTING MACHINE
Filed Dec. 9, 1939 11 Sheets-Sheet 6
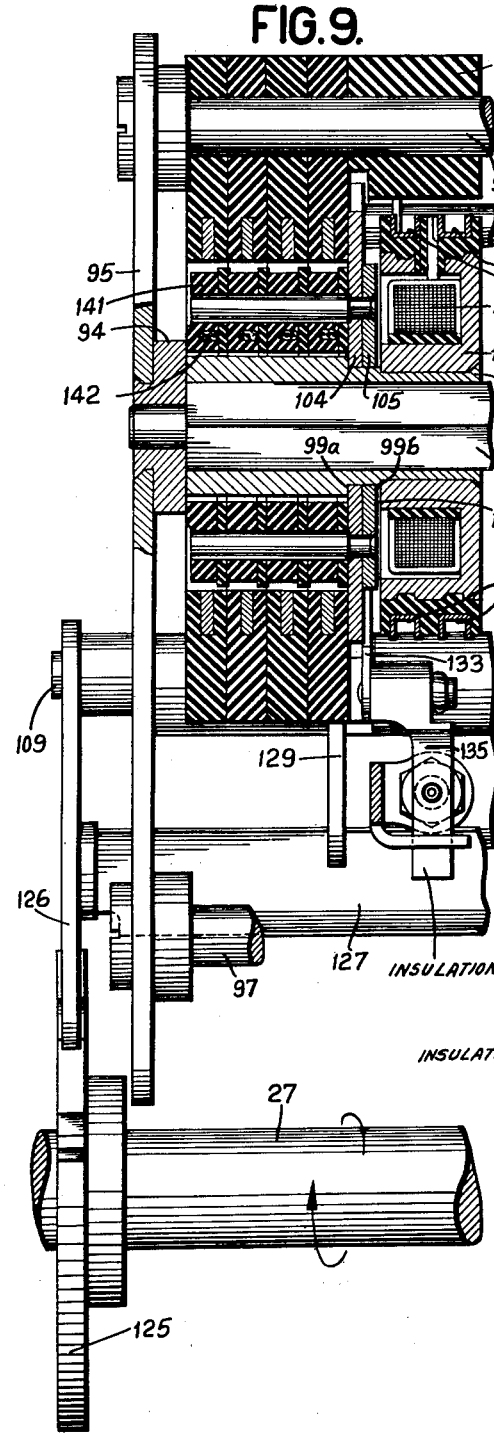
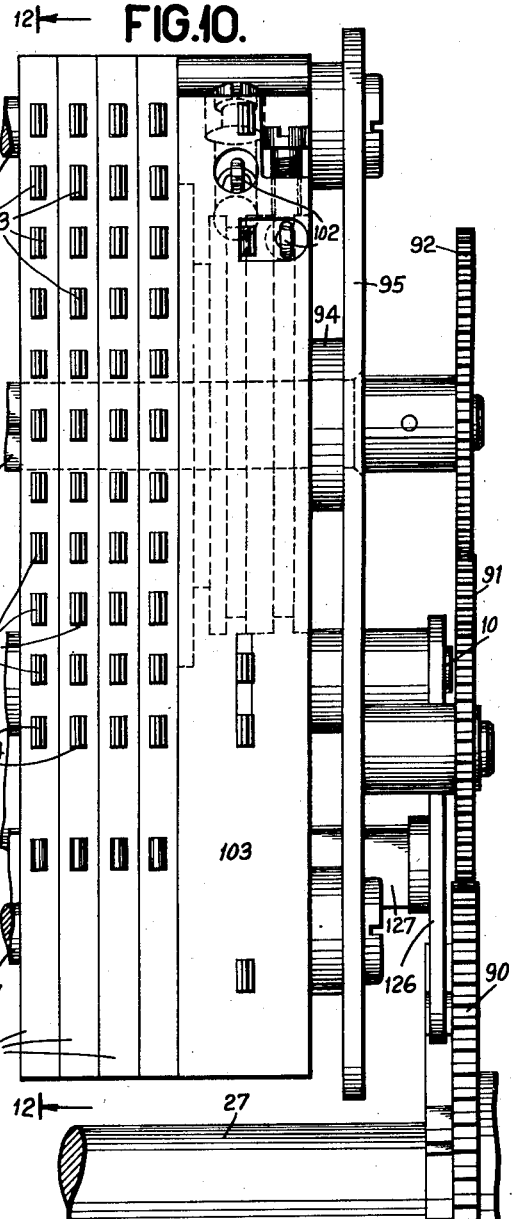
INVENTOR.
Arthur H. Dickinson
BY
ATTORNEYS.

March 7, 1944.  A. H. DICKINSON  2,343,370
ACCOUNTING MACHINE
Filed Dec. 9, 1939  11 Sheets-Sheet 7
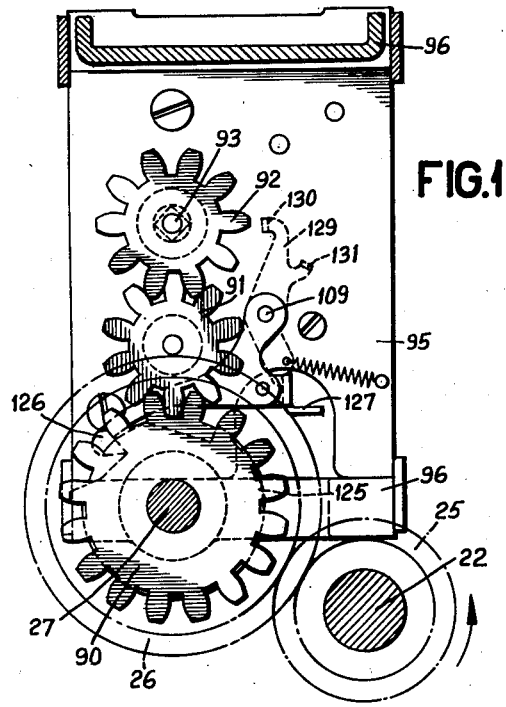
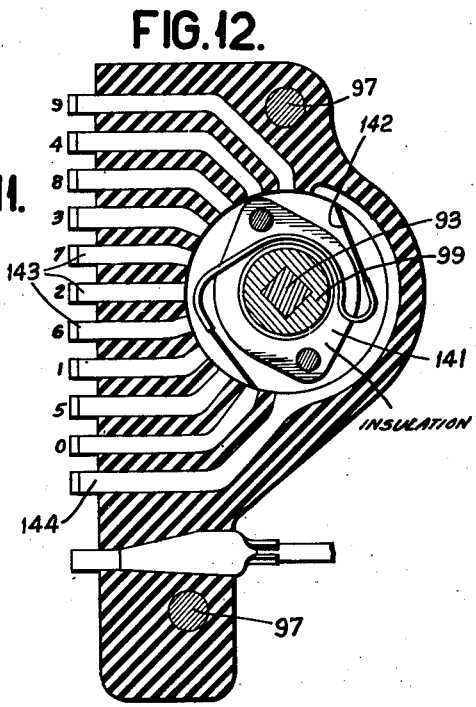
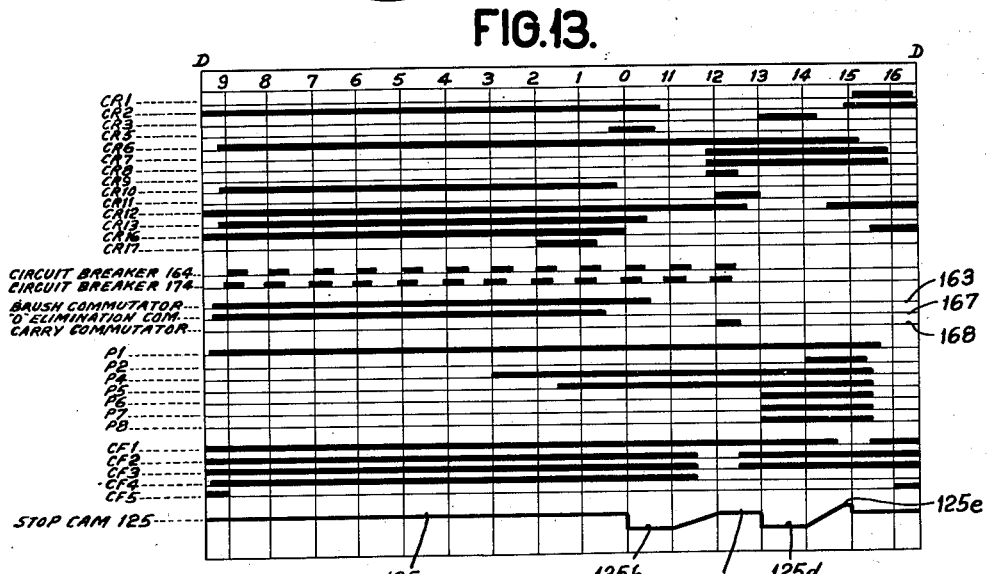
INVENTOR.
Arthur H. Dickinson
BY
ATTORNEYS.

March 7, 1944.  A. H. DICKINSON  2,343,370
ACCOUNTING MACHINE
Filed Dec. 9, 1939  11 Sheets-Sheet 8

March 7, 1944. A. H. DICKINSON 2,343,370
ACCOUNTING MACHINE
Filed Dec. 9, 1939 11 Sheets-Sheet 9

INVENTOR
Arthur H. Dickinson
BY
ATTORNEY

March 7, 1944.　　　A. H. DICKINSON　　　2,343,370
ACCOUNTING MACHINE
Filed Dec. 9, 1939　　　11 Sheets-Sheet 11
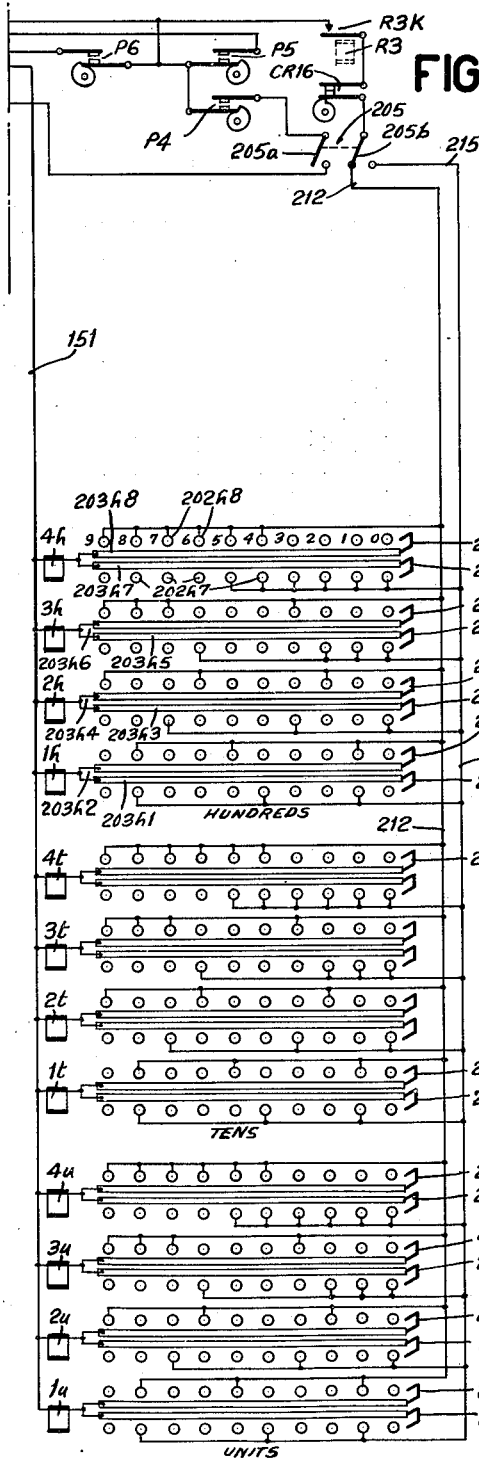
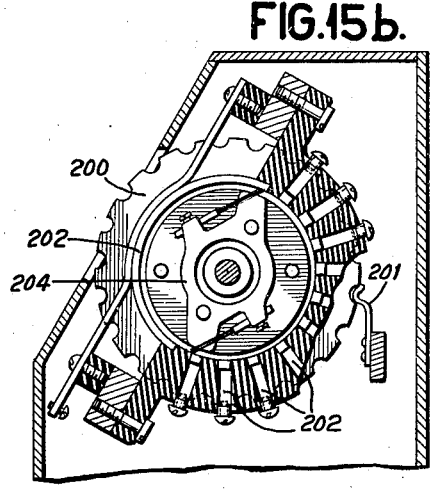
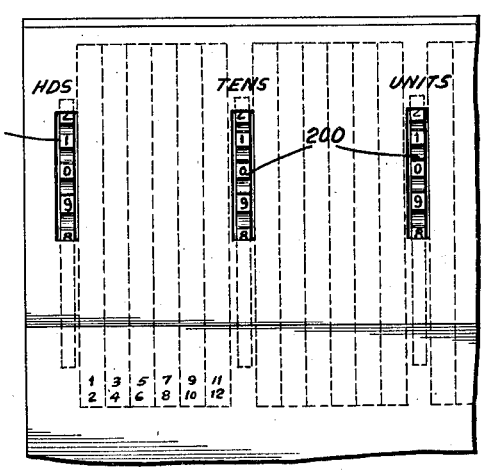
INVENTOR
Arthur H. Dickinson
BY
ATTORNEY Patented Mar. 7, 1944

2,343,370

UNITED STATES PATENT OFFICE 2,343,370

ACCOUNTING MACHINE

Arthur H. Dickinson, Scarsdale, N. Y., assignor to International Business Machines Corporation, New York, N. Y., a corporation of New York Application December 9, 1939, Serial No. 308,325

10 Claims. (Cl. 235—61.6)

This invention relates to accounting machines and more particularly to the type wherein a series of related entries are effected into an accumulator and such accumulator is then cleared, or zeroized, so that it is in a condition to receive subsequent entries related to another transaction, or accounting operation.

In some types of accounting operations, it is desirable to effect subsequent entries in the accumulator after the accumulator is cleared to represent zero. In other types of accounting operations, to be more clearly described hereinafter, it is desirable to enter in the accumulator a base or initial amount which is in an accounting relationship to subsequent entries. One form of accounting operation of the last described type, and which involves the last mentioned procedure, is the preparation of bank statements. These statements are prepared from transaction cards representing deposits and withdrawals and the accumulator will represent the balance at the termination of such accounting operations. In the preparation of such statements, the old balance must be considered and this may be derived from the previous statement. In the preferred form of invention shown herein, the old balance is represented by the manual setting of amount representing wheels, and these may be set before the operation of the machine is initiated to effect an accounting operation from a series of transaction cards. Upon starting up the machine, the machine goes through a reset cycle and the previous amount, if contained therein, is cleared out. With the incorporation of the present improvements the machine will go through a reset cycle and will tend to reset the accumulator to zero but the entry control devices controlled by the manual setup device will control the zeroizing mechanism so as to effect the entry of the amount represented on the wheels. This is the initial entry and forms the base for subsequent accounting operations. In the above example, the old balances are usually positive in amount since a balance as a positive amount is ordinarily required to maintain a bank account.

Other types of accounting operations in which the present improvements may be found useful consist in operations wherein the initial entry is negative, and therefore is deduced from the subsequent transactions. An example of this type of accounting operation is the determination of the amount of income payable to employees who are subject to deduction of taxes required by the Social Security Act. For certain classes of employees a lump-sum deduction is made when the income of such employees is above an amount which is legally fixed. Since such lump-sum amounts are deductions they are negative from an accounting standpoint and should, therefore, be deducted from subsequent entries. In the present improvements, this amount is set up in the manual setup device as a positive amount but by a selective control this amount will be entered into the accumulator negatively so this initial entry will be algebraically added to subsequent entries. It is well known in the art that negative amounts may be represented by complementary numbers and in the present improvement the negative amounts are preferably entered as the tens complement of the amount to be deducted.

Obviously in the entry of an initial amount which is negative the machine will go through a reset cycle but instead of resetting the accumulator to zero the wheels of the accumulator will be repositioned so that they represent the tens complement of the amount set up on the setting wheels. With this initial amount in the accumulator, the subsequent entry of amounts in the accumulator will effect algebraic accounting operations so that at the termination of the entry operations the net income to be paid to the employee will be represented on the accumulator.

The broad object of the present invention is, therefore, to provide means under control of the operator whereby an accumulator during a resetting or clearing operation may be repositioned from one amount representing position to another amount representing position which represents a predetermined and preselected amount.

Broadly speaking, it is an object of the present invention to provide selective means which will cause during a resetting operation the repositioning of an accumulator to represent zero, or a predetermined amount equal to, less than, or greater than the amount originally standing on the accumulator.

A still further object of the present invention is the provision of means to effect under control of the operator during the reset cycle of the machine the repositioning of an accumulator to represent a predetermined amount, either positive or negative.

A more specific object of the invention is to cause a control means for a resetting means, which resets the accumulator to zero by the addition of the tens complement thereon, to modify the operation of such resetting means so that it will cause the actuation of the accumulator to represent a predetermined amount, positive or negative in sign.

Another object of the present invention is to provide an accumulator actuating means which is under control of the accumulator elements and also under control of a manual setup device, both in cooperation causing the actuating means to reposition the accumulator to represent a predetermined amount determined by the manual setup device.

Another object of the present invention is to provide means whereby the resetting mechanism of an accumulator may be modified so that instead of resetting an accumulator to zero, the elements thereof may be repositioned in the same reset cycle to represent a predetermined amount.

More specifically, it is an object of the present invention to incorporate in the machine a manual setup device comprising a series of wheels which may be manually positioned so as to represent a predetermined amount and to provide a control by such manual setup device so that the resetting mechanism for an accumulator may be modified so that instead of resetting the accumulator to zero the latter may be repositioned to represent the preselected amount.

Another object of the present invention is to provide a means for repositioning the accumulator which is controlled by digit representing circuits and which circuits are selected so as to effect the repositioning of each denominational ordered element of the accumulator from a position representing one digit to a subsequent position representing a selected digit.

A still further object of the present invention is to provide a resetting mechanism for an accumulator, which tends to reset the accumulator to zero, with associated control devices. These control devices are preferably controlled by the accumulator as well as a manual setup device so that both affect the operation of the entry control devices for determining the position of the accumulator wheels to represent the preselected amount.

While the particular form of accumulator actuating mechanism and control devices therefor shown herein are utilized for repositioning of an accumulator during a reset operation, the novel arrangement disclosed may have other uses, and may be utilized for normal entry operations in an accumulator. The selecting means for digit representing circuits has a wide variety of uses and may be utilized for other purposes. It should, therefore, be understood that while the present improvements are shown herein as having a specific application, the present form of the embodiment and its application should be considered as merely illustrative, and not restrictive.

Other objects of the invention will be pointed out in the following description and claims and illustrated in the accompanying drawings, which disclose, by way of example, the principle of the invention and the best mode, which has been contemplated, of applying that principle.

In the drawings:

Fig. 7 is a section taken along the lines 7—7 of Fig. 1, taken through the central plane of one of the denominational orders.

Fig. 8 is a detail of the tens carry controlling cam and related contacts.

Fig. 9 is a sectional view taken substantially along the lines 9—9 of Fig. 6.

Fig. 10 is a view looking from the left of Fig. 6.

Fig. 11 is a view at a reduced scale looking from the right of Fig. 10 showing the gear drive to the accumulator shaft.

Fig. 12 is a detail of the readout device for the accumulator unit, the view being along lines 12—12 of Fig. 10.

Fig. 13 is a timing diagram showing the period of closure of the various cam operated contacts and commutators.

Figure 14:
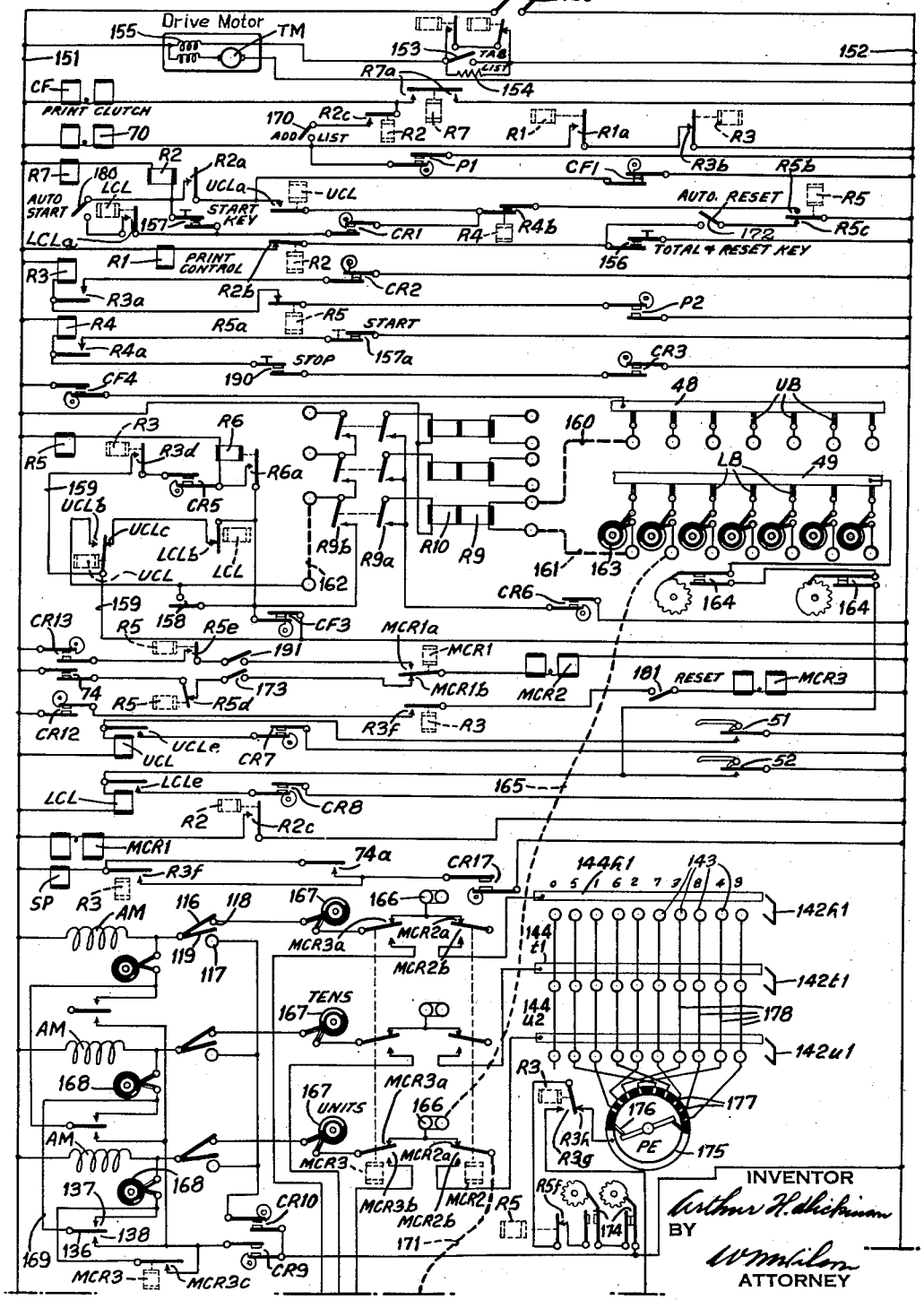
Figure 14A:
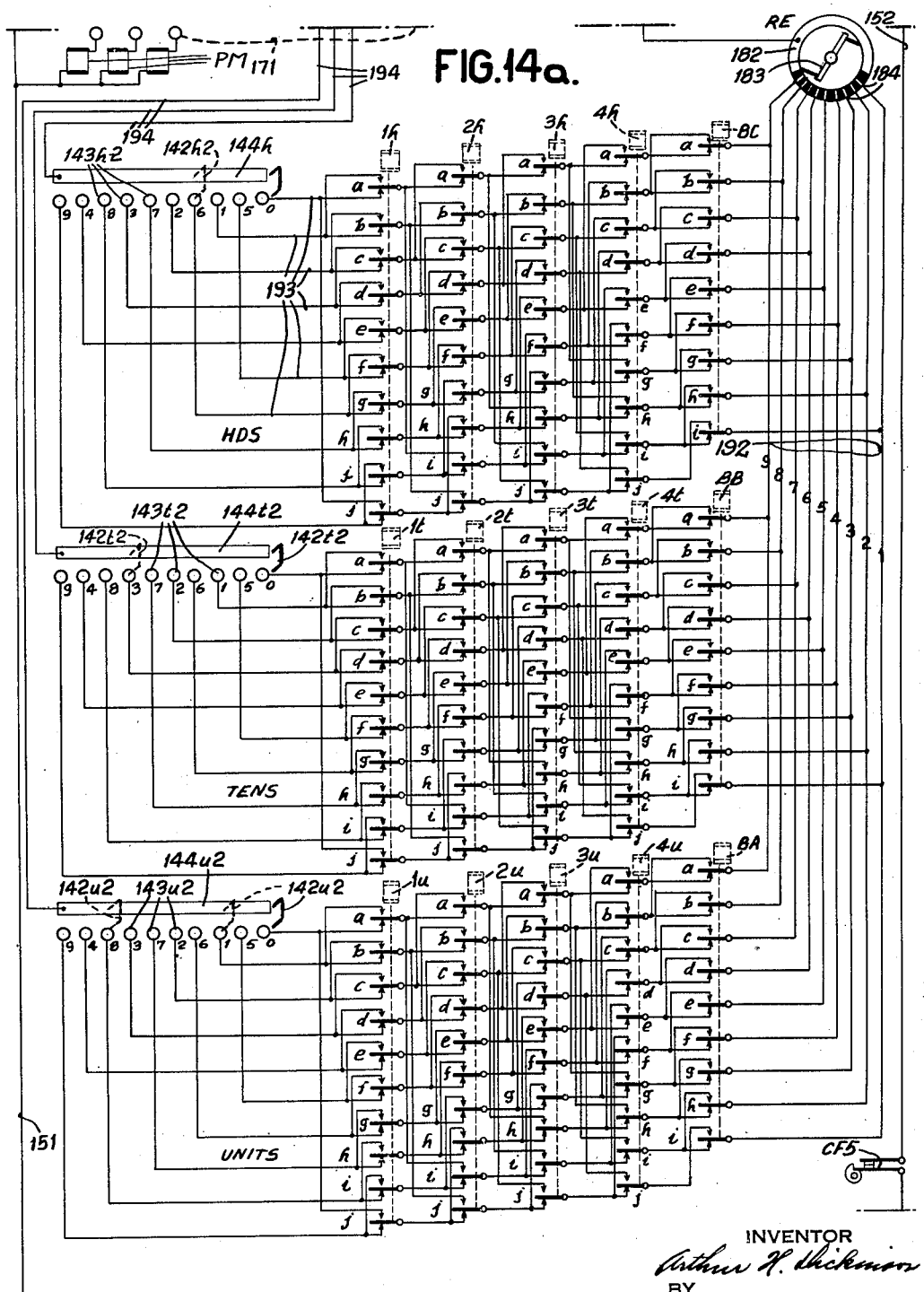
Figure 14B:
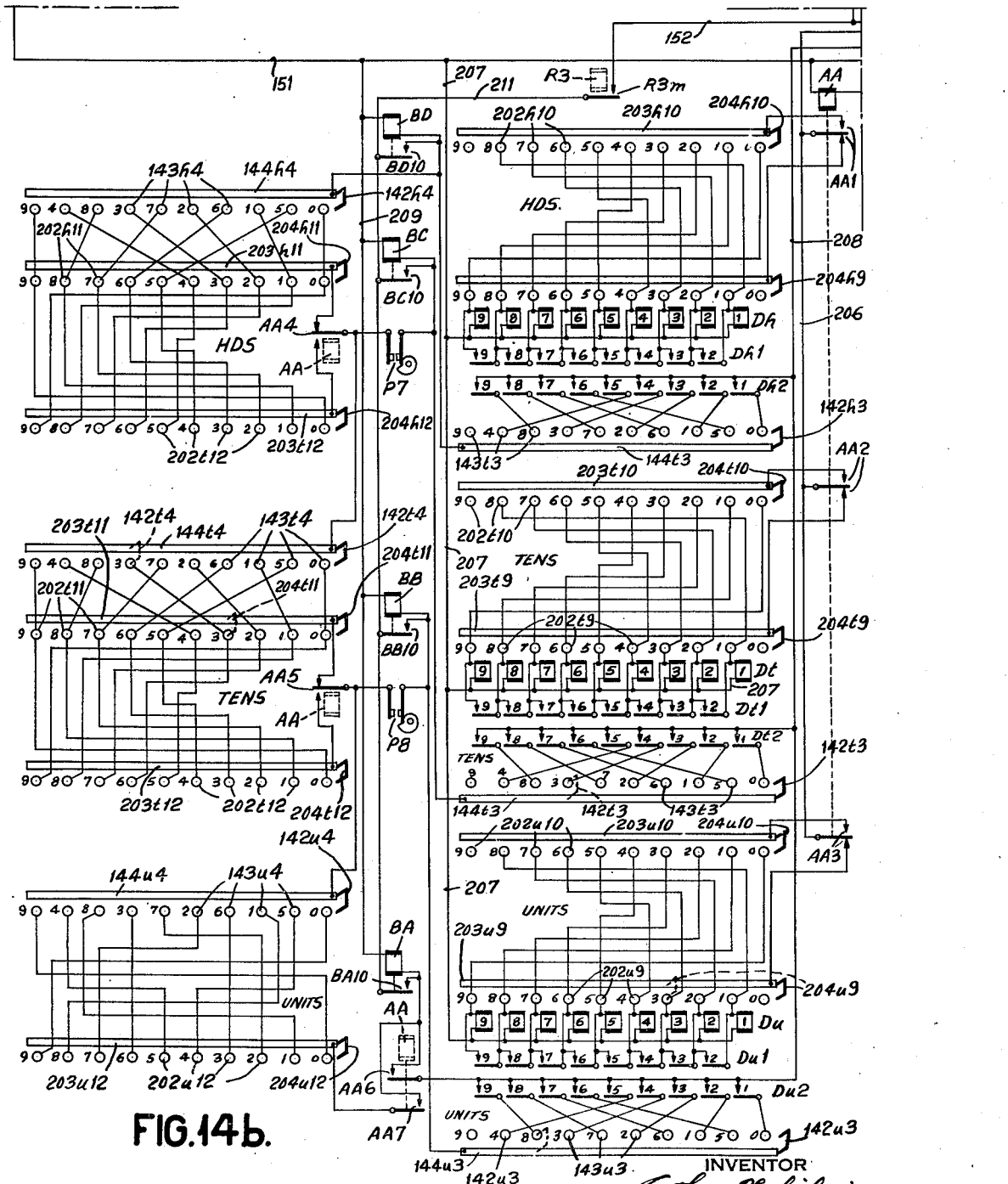

Figs. 14, 14a, 14b, and 14c show the electrical wiring diagram, with Fig. 14a intermediate Figs. 14 and 14b, and Fig. 14c at the right of Fig. 14b.

Fig. 15a is a view in side elevation of one order of the manual setup device, and Fig. 15b is a view in front elevation of the three orders utilized to set up the representation of the three digit amount to which the accumulator is to be repositioned.

GENERAL DESCRIPTION

The present improvement is preferably incorporated in the type of machine disclosed in the application of Lake and Pfaff, Serial No. 182,402, now Patent No. 2,232,006, dated February 18, 1941, and the following is a description of the operation of the machine.

The separate units of the machine will first be described in detail and their mechanical operation explained. Following this, the circuit diagram will be explained and the complete operation of the entire machine set forth.

Figure 1:
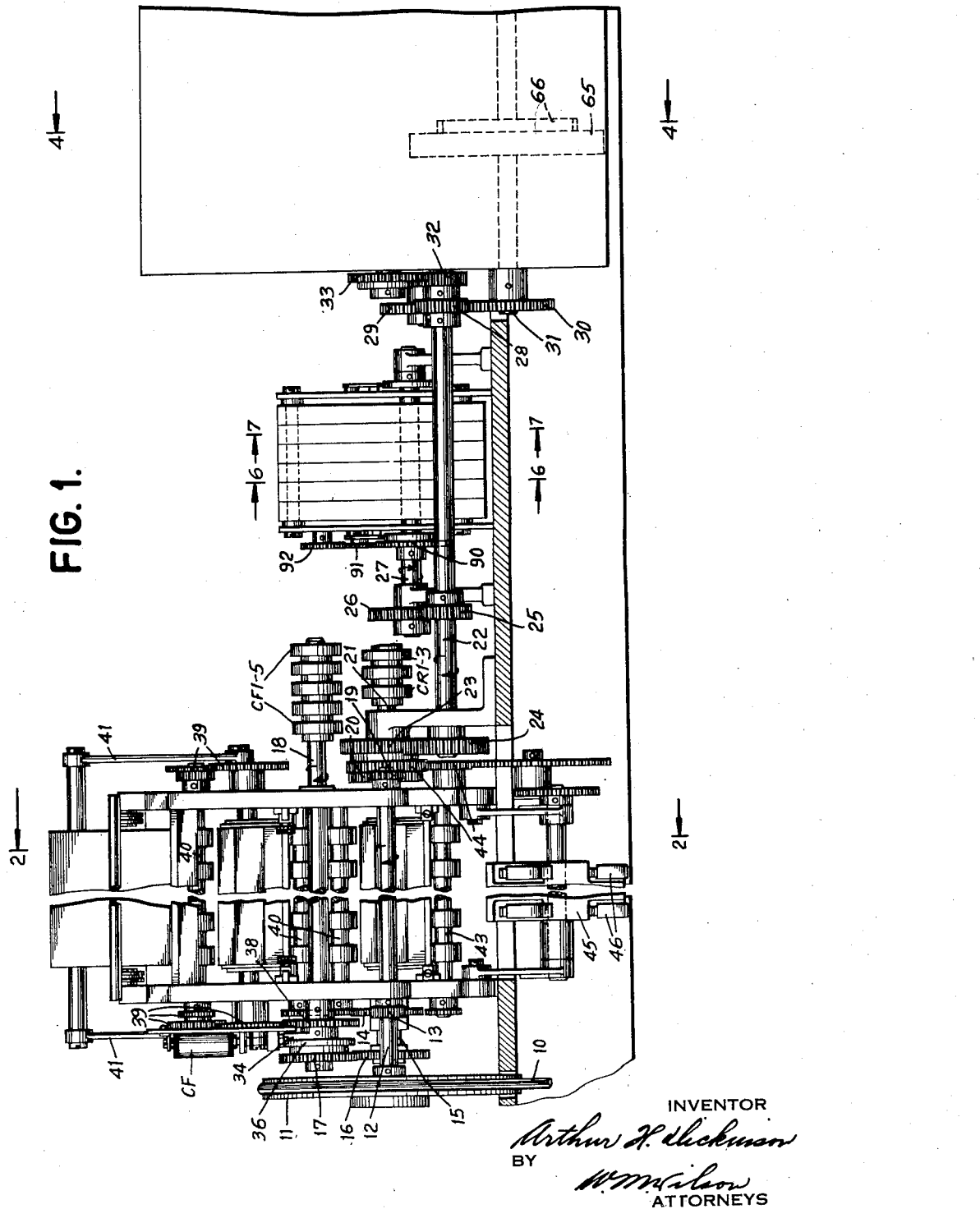
Fig. 1 is a front view of the machine showing the relationship and driving connections between the card feeding, accumulating and printing sections of the machine.

Referring to Fig. 1, the machine comprises, generally, a card feeding and analyzing section at the left end thereof, which feeds the well known Hollerith record cards to the analyzing devices where they are sensed by the analyzing mechanism. The accumulator is located in the center of the machine. The printing mechanism is located at the right end of the machine and comprises a number of so-called banks of printing type bars.

MAIN DRIVING CONNECTIONS

The driving motor, represented at TM in Fig. 14 (but not shown in the mechanical views), has suitable driving connection as by a belt 10 (Fig. 1) with a pulley 11 carried by a shaft 12. During the operation of the machine motor TM is in constant operation so that shaft 12 rotates constantly and through a gear 13 mounted thereon drives a gear 14 on a rod 15 which also carries a gear 16. The latter gear meshes with a gear 17 freely mounted on a shaft 18 to which the gear is clutched to operate the card feeding devices, as will be described.

At its right hand extremity, shaft 12 carries a gear 19 meshing with a gear 20 on a shaft 21 from which the accumulator drive shaft 22 is driven by means of gears 23 and 24 so that shaft 22 is also in constant rotation. Through gears 25 and 26 the shaft 27 which operates the accumulator is driven.

Figure 4:
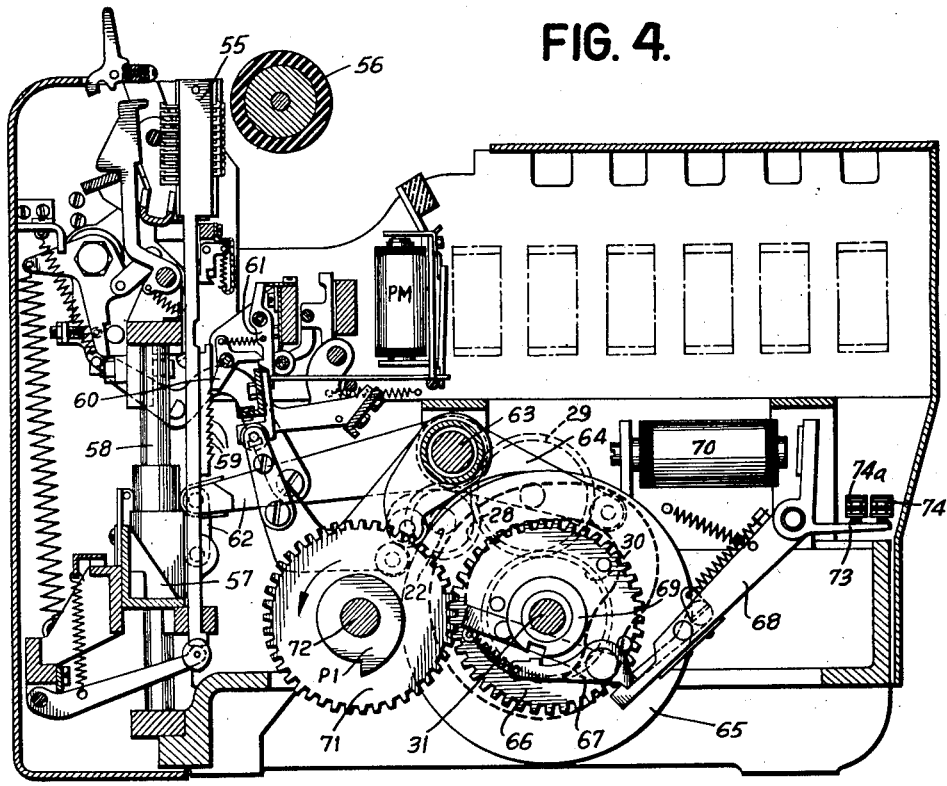
Fig. 4 is a central section through the printing mechanism of the machine, the section being taken along the lines 4—4 of Fig. 1.
Figure 5:
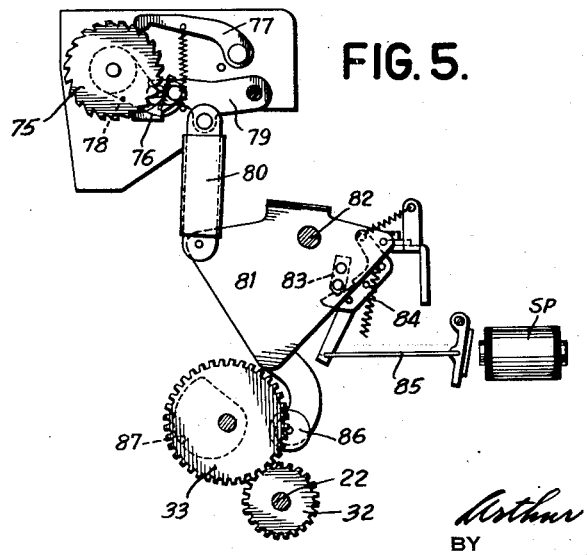
Fig. 5 is a detail showing the platen spacing control mechanism for the printing unit looking in the same direction as Fig. 4.

To drive the printing mechanism, shaft 22 carries a gear 28 (see also Fig. 4) which through an idler 29 drives a gear 30 secured to the printing driving shaft 31. Shaft 22 also, through a gear 32, drives a gear 33 (Fig. 5) which operates the paper spacing mechanism of the printing unit.

Thus, through the connections traced the several shafts 12, 21, 22, and 31 are in constant rotation as long as the motor TM is in operation.

CARD FEEDING MECHANISM

Figure 2:
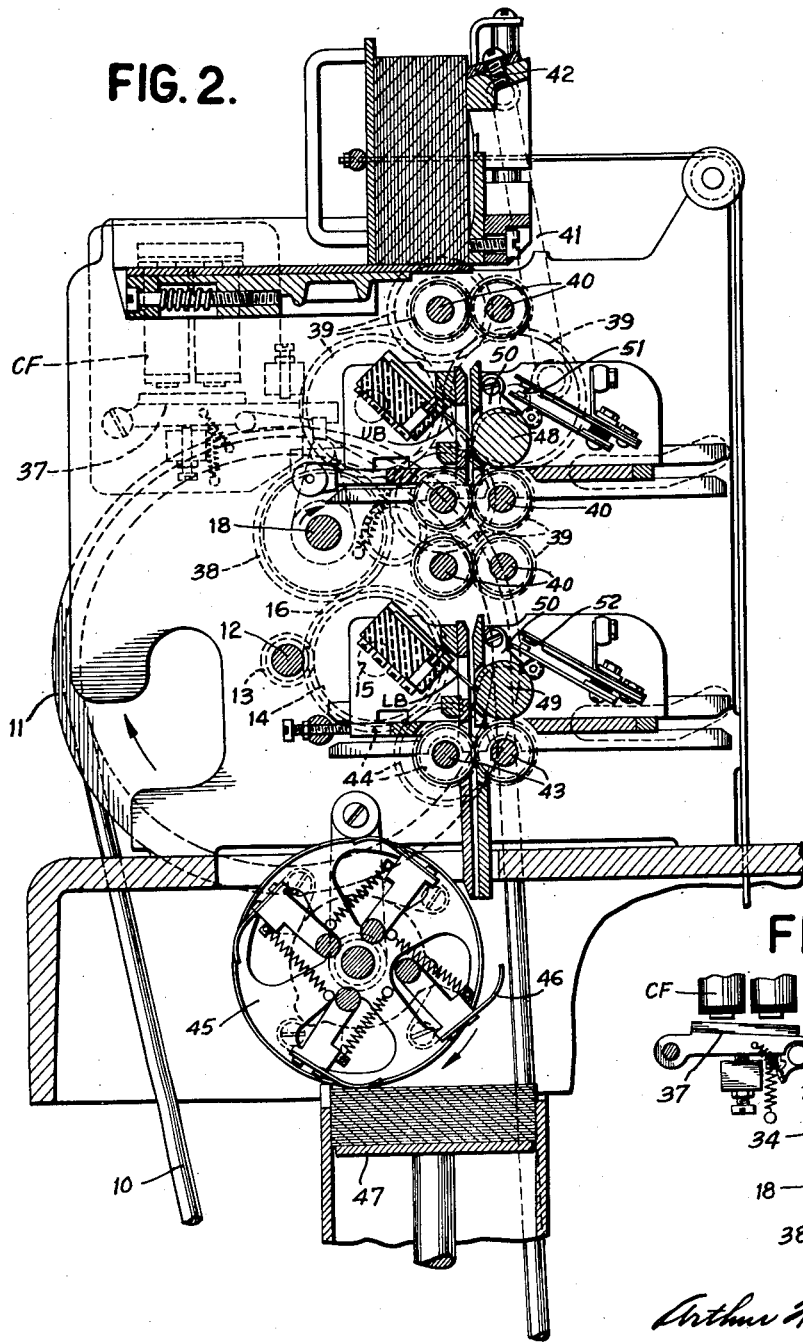
Fig. 2 is a central section through the card feeding and analyzing section of the machine, the section being taken along the lines 2—2 of Fig. 1.
Figure 3:
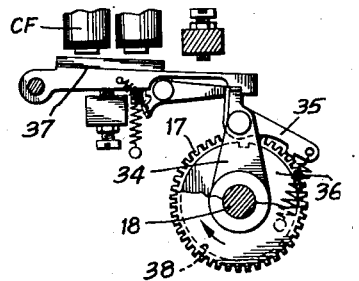
Fig. 3 is a detail of the card feed clutch devices shown in dotted outline in Fig. 2.

Referring to Fig. 3, shaft 18 has secured thereto an arm 34 which carries a spring-pressed dog 35 in the plane of a notched driving disk 36 which is integral with constantly running gear 17. Energization of magnet CF will attract its armature 37 and release dog 35 for engagement with disk 36 whereupon shaft 18 will rotate and through a gear 38 carried thereby will, through gearing generally designated 39 in Fig. 2, cause rotation of card feed roller driving shafts 40. One of the gears 39 on each side of the card feed section has eccentrically mounted thereon one end of a link 41 whose other extremity connects with the picker 42 mounted for vertical reciprocation so that for each rotation of shaft 18, a card is moved downwardly from the supply magazine to the uppermost pair of feed rollers. The rollers on shafts 40 advance the cards downwardly, in succession, to a pair of feed rollers on the lowermost pair of shafts 43 which are in constant rotation due to direct gear connection designated 44 with shaft 12. From this point the cards are advanced to a stacker mechanism generally designated 45 whose spring-pressed clips 46 grip the leading edges of the cards and deposit them upon tray 47.

Along the line of travel of the cards are located the upper analyzing brushes UB and the lower analyzing brushes LB mounted in insulating blocks and cooperating with contact rollers 48 and 49 respectively. At each of the sets of brushes is a pivoted card lever 50, the upper of which cooperates with a pair of contacts 51 and the lower of which cooperates with a pair of contacts 52. The levers serve to close their respective contacts while a card is passing the brushes and permit the contacts to open during the interval between cards.

The general operation of the card feeding and analyzing mechanism, in terms of cycles of operation of the machine, is as follows: (A cycle is represented by one reciprocation of the picker 42 or three and a half revolutions of shaft 12.)

With the machine at rest, the picker 42 is in the position indicated in Fig. 2 and during the first cycle, the picker will move upwardly to a position above the first card and then move downwardly to advance the leading card to the feed rollers driven by shafts 40 which advance it to the upper brushes UB. At the end of the first cycle, the leading edge of the card will have slightly passed the upper brushes UB, insulating them from the contact roller 48 and the picker 42 will again be in the position of Fig. 2. During the second cycle, the card will be advanced by the feed rollers to an exactly similar position with respect to the lower brushes LB; that is, its leading edge will be slightly past the lower brushes LB, insulating them from the contact roller 49. Meanwhile, during this second cycle, a second card will have been advanced to the upper brushes so that there is now a card under the upper brushes and a card under the lower brushes. During the third cycle, the cards will pass the lower and upper brushes concurrently and corresponding index point positions will be analyzed concurrently by the two sets of brushes. At the end of the third cycle, the first card will have been advanced to a position where its leading edge has entered the open jaws of one of the clips 46 and during a fourth cycle, the clips will grip the card and bring it into position upon the discharge stack or tray 47.

The distance between the trailing edge of the first card and the leading edge of the next card is greater than the contacting edge of the card levers (actually ¾ of an inch) so that the card levers will rock in and out between the cards.

On shaft 18 (Fig. 1) are carried several cams which control the operation of contacts designated with the prefix CF in the circuit diagram (Figs. 14–14c), indicating that they operate only during card feeding operations. On the shaft 21 are similar cams controlling contacts designated CR in the circuit diagram to indicate that they are controlled by constantly running cams.

For a more detailed description of the construction and operation of the card feeding and analyzing mechanism reference may be had to the Patent No. 1,976,617, granted to C. D. Lake et al. on October 9, 1934.

PRINTING MECHANISM

The printing mechanism of the present machine is substantially similar to that of the Lake et al. Patent No. 1,976,617 as regards the type bar action so that the same need be but briefly described.

Type bars 55 (Fig. 4) are mounted for vertical reciprocation past a printing platen 56 and are resiliently supported at their lower ends on crosshead 57 which is slidable up and down on rods 58. Each type bar has a series of stopping teeth 59 which, as the type bar rises, pass the toe of a stopping pawl 60, normally latched as shown by a latch 61. The action is such that as the bar rises, energization of print magnet PM when any tooth 59 is passing the toe of pawl 60 will rock latch 61 to release the pawl for engagement with a selected tooth 59 and interrupt further upward movement of the bar. The yieldable connection between the bar and crosshead 57 permits the bar to stop while the crosshead continues on its invariable excursion.

For reciprocating the crosshead there is the usual link and arm connection 62 to shaft 63 which carries an arm 64 upon the free end of which is a roller engaging in the cam groove of a box cam 65, freely mounted on constantly running shaft 31. The cam 65 has secured thereto a gear 66 to which is pivoted a clutching dog 67 normally held in the position shown in Fig. 4 by clutch lever 68, thus holding cam 65 stationary. Lying in the plane of dog 67 is a driving disk 69, secured to shaft 31 so that upon energization of clutch magnet 70, lever 68 integral with the armature of the magnet will release dog 67 to engage in the notch of disk 69 and cam 65 will accordingly be rotated to operate crosshead 57 and type bars 55.

Gear 66 meshes with a gear 71 on shaft 72 to drive the latter on which are mounted contact operating cams whose contacts are prefixed P in the circuit diagram (Figs. 14 and 14b) to indicate that they operate only during printing operations. An extension 73 of lever 68 cooperates with pairs of contacts 74 and 74a to close the same while the magnet 70 remains energized.

At one extremity of the shaft of platen 56 is a ratchet 75 (Fig. 5) with which the usual spacing pawl 76 and detent 77 cooperate. Pawl 76 is carried by an arm 78 which has pin and slot connection with a lever 79 connected by an adjustable link 80 with a plate 81 pivoted at 82. Plate 81 carries a block 83 normally engaged by a latch 84 connected by a link 85 to the armature of a magnet SP. Energization of magnet SP will release plate 81 so that a roller 86 carried thereby may follow the contour of cam 87 carried by the constantly rotating gear 33 and through the consequent oscillation of the plate 81 effect line spacing of the platen.

ACCUMULATOR

Referring now to Figs. 10 and 11, the constantly running shaft 27 carries a gear 90 which, through an idler 91, drives a gear 92 carried by a square shaft 93 which is thus in constant rotation. The shaft 93 is supported in bearings 94 of side plates 95 which in turn are supported by the framework 96. Between the plates 95 are cross bars 97 holding them in spaced relationship and aiding in the support of the mechanism of six denominational orders of the accumulator.

Since the several orders are all identical in construction and there being no mechanical interconnections between them except the common supporting and driving shaft, the following detailed description of one order will suffice for all.

On the square driving shaft 93 is a fitted bushing 99 (Fig. 9) upon which a magnet yoke 100 is rigidly secured. Carried about the periphery of yoke 100 and insulated therefrom and from each other is a pair of annular collector rings 101 to each of which is connected an end of magnet winding AM positioned within yoke 100. Trailing against each ring 101 is a brush 102 (Fig. 6) slidably mounted and locked in a suitable bore in insulating block 103 carried by rods 97. The yoke 100 carrying with it winding AM and rings 101 constitutes the driving element of the accumulator clutch whose driven element includes the toothed wheel 104 and tens carry-cam 105 (Figs. 9 and 7). The wheel and cam are riveted together as indicated in Figs. 7 and 9, and are freely mounted on the section of bushing 99 between its shoulders 99a and 99b (Fig. 9). The combined thickness of the wheel and cam is slightly less than the distance between shoulders 99a and 99b so that there is an air gap 106 between yoke 100 and cam 105. This air gap is very slight and measures about five thousandths (.005) of an inch providing just a working clearance. On the drawings, Fig. 9, the distance is exaggerated to show the gap more clearly.

Figure 6:
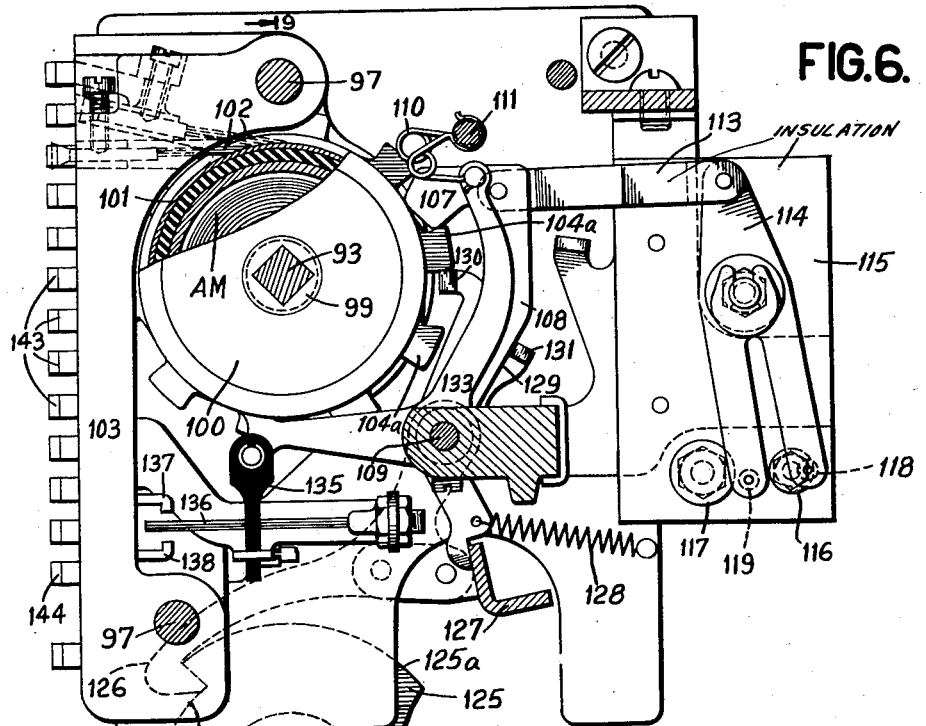
Fig. 6 is a section through the accumulator along the lines 6—6 of Fig. 1. The view is taken along the dividing line between two adjacent denominational orders.

Wheel 104 (Fig. 7) is provided with ten teeth 104a, between two of which, when the wheel is at rest, there extends the nose 107 of a lever 108 which is freely pivoted on a rod 109 (see Fig. 6a) and held in the position shown in Figs. 6 and 7 by a looped wire spring 110 connected at one end to a rod 111 and at its other end to a pin in nose 107. The spring 110 and lever 108 thus form a toggle with the spring urging nose 107 into contact with wheel 104.

When winding AM is energized, wheel 104 and cam 105 are magnetically clutched to yoke 100 and commence to rotate therewith. That is, wheel 104 and cam 105 are attracted by magnet AM and drawn to the right as viewed in Fig. 9, closing up the air gap 106 and physically engaging yoke 100. As wheel 104 commences to turn with yoke 100 to which it is now magnetically coupled, the edge of one of its teeth 104a bears against the upper inclined edge of nose 107 and cams lever 108 clockwise (as viewed in Fig. 7) about its pivot 109, carrying the end of spring 110 attached to nose 107 to the right of a line between centers 109 and 111 to the position shown in Fig. 6a where it will remain until the wheel 104 is disengaged again.

Lever 108 when rocked by a tooth 104a serves to operate contacts to provide a holding circuit for winding AM. The arrangement is as follows: A link 113 of insulating material connects lever 108 with a lever 114 pivoted to an insulating block 115 in which are embedded metallic contacts 116 and 117. Lever 114 has two contact points 118 and 119. When lever 108 engages wheel 104 as in Fig. 6, contacts 116 and 118 are in engagement and when the levers 108 and 114 are shifted as in Fig. 6a, contacts 117 and 119 are in engagement, the parts being so proportioned that the contacts 117, 119 engage before contacts 116, 118 disengage. In other words, a so-called "make-before-break" action occurs as lever 114 is shifted.

Energization of winding AM and clutching of the accumulating wheel 104 is effected at differential times depending upon the location of the perforation sensed in the record card passing through the card feeding section of the machine and declutching is effected at a fixed point in the cycle so that the amount that wheel 104 is rotated will be proportional to the value of the hole sensed in a particular card column. This declutching is brought about as follows: On shaft 27 is a cam 125 with which a follower 126 cooperates. The follower is integral with a bail 127 which extends across all of the denominational ordered units. Each order has a lever 129 pivoted on rod 109 with its lower extremity bearing against the bail 127 and provided with a spring 128, which spring 128 urges the follower 126 against cam 125. At its upper end, lever 129 has lateral extensions 130 and 131, the former lying in the plane of wheel 104 and the latter extending behind lever 108.

Figure 6A:
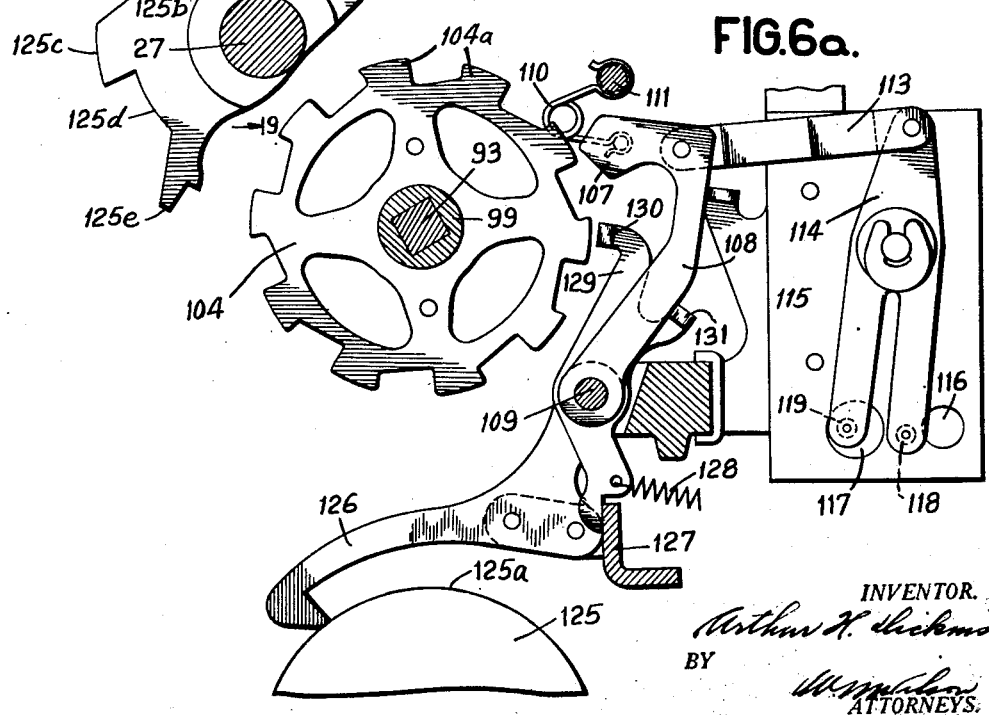
Fig. 6a shows certain parts of Fig. 6 in a different position.

The operation is such that during the entering period of the cycle, or while the digit representing index point positions of the card are passing the analyzing brushes, the follower 126 rides on the intermediate concentric portion 125a of cam 125 as in Fig. 6a holding bail 127 and through it lever 129 in the position shown in Figs. 6a and 7. At the "0" point in the cycle (see Fig. 13) follower 126 drops quickly to the surface 125b of cam 125 and its bail 127 will free lever 129 to be rocked rapidly in a counterclockwise direction by its spring 128 bringing projection 130 on lever 129 into the space between two of the teeth 104a. At the same time, projection 131 engages lever 108 swinging it back from the position of Fig. 6a to that of Fig. 6, thus causing the holding circuit of winding AM to be broken. This holding circuit will be more particularly pointed out in connection with the circuit diagram. It suffices at this time to state that the circuit is made when contacts 117, 119 engage and is broken when the contacts are separated.

With the current thus interrupted, projection 130 will engage the leading edge of a tooth 104a and positively interrupt further rotation of the now released accumulating wheel 104. At the same time, the trailing edge of the engaged tooth 104a is overlapped by nose 107 to prevent any retrograde movement of the parts. Continued rotation of cam 125 will, through portion 125c thereof, again release wheel 104 for possible tens carry operations and portion 125d will again interrupt the wheel after a single step of movement. Finally, the highest portion 125e of cam 125 will cause lever 129 to rock an additional amount in a clockwise direction to restore a tens carry lever 133, if the same had previously been rocked counterclockwise by the devices now to be described. When magnet AM is deenergized and wheel 104 stopped, the wheel 104 and cam 105 are no longer urged into driving contact with yoke 100 and the wheel is free to move to the left away from the yoke, which it may do due to vibration of the machine. Failure to move back will have no effect on the wheel as it is held against rotation, and with winding AM deenergized only a slight frictional effect would be present which in itself would tend to push the wheel and cam back.

As stated above, wheel 104 has integral therewith carry cam 105 (Fig. 8) which is provided with a notch 105a, and a rise 105b. Carry lever 133 pivoted at 109 has its nose held against cam 105 due to the action of the looped spring 134 urging lever 133 clockwise. Lever 133 carries a depending member 135 of insulating material through which a brush 136 extends to make contact with either of contacts 137 or 138. Normally the parts occupy the position of Fig. 7 with brush 136 lying intermediate contacts 137, 138. When wheel 104 has been advanced to register "9" thereon, cam 105 is in the position shown in Fig. 8 wherein the nose of lever 133 is in the notch 105a, permitting elevation of brush 136 for engagement with contacts 137. When wheel 104 passes through "0," rise 105b on cam 105 will rock lever 133 to its dotted line position indicated in Fig. 8 in which position spring 134 will now hold it since the point of connection between spring 134 and lever 133 is now to the left of the line between centers 111 and 109. As a result, brush 136 is shifted to engage contact 138 and will remain in such position until after the carry portion of the cycle when the high portion 125e of cam 125 causes lever 129 to rock lever 133 back to its position of Fig. 7.

Adjacent to accumulating wheel 104 (Fig. 9) and carried thereby is a brush structure comprising for each readout device a holder 141 of insulating material and a wire brush 142 fitted within a groove in the holder (see Fig. 12). In the plane of brush 142 are arranged related commutator segments 143 as shown and a common arcuate segment 144. Brush 142 serves to make electrical connection between common segment 144 and each of the related segments 143 as the accumulating wheel 104 advances. Since the wheel 104 (Fig. 7) has ten teeth, it moves a tenth of a revolution for each unit entered. Segments 143 are spaced one-twentieth of a circle apart so that brush 142 of each readout device stops at the segments in the order in which they are numbered in Fig. 12. In the position shown the "0" segment 143 is connected with common segment 144. This above-described readout device is shown in Patent No. 2,138,636 to C. D. Lake and constitutes one of the readout devices by means of which the amount or total standing in the accumulator wheel may be read out, and for the purpose of the present invention each accumulator wheel is provided with four separate readout devices, each comprising a brush 142, a series of segments 143 and a common segment 144. The elements of each readout device are designated by a letter, $u$, $t$, or $h$, designating units, tens and hundreds orders, and also by a numeral 1, 2, 3, and 4, designating the four sections of the readout device.

WIRING DIAGRAM

The circuit diagram will now be explained with particular reference to the various operations of adding, listing, total printing, and resetting and to the sequence in which the several functions are carried out.

*Starting cycles.*—With a stack of cards placed in the supply hopper of the machine, Fig. 2, the machine is ready to start. Closure of switch 150 (Fig. 14) puts current on left side of line 151 and on right side of line 152, and current will flow through the drive motor TM. If the machine is to "tabulate," that is, add without accompanying printing, switch 153 is left in the open position shown so that a resistance 154 is in series with the motor field 155 to obtain high speed operation. When set for "listing," that is, concurrent adding and printing or printing alone, switch 153 is closed, shunting out resistance 154 to obtain a slower operating speed.

The first operation is to depress the total and reset key to close contacts 156 (Fig. 14) which complete a circuit from line 151, print control relay R1, relay contacts R2b and contacts 156 to line 152. Relay R1 closes its contacts R1a to energize the print clutch magnet 70 through a circuit from line 151, magnet 70, contacts R1a, R3b to line 152. The printing mechanism will now go through a cycle of operations during which the P contacts operate and near the end of this cycle contacts P2 close, establishing a circuit from line 151, control pickup relay R3, relay contacts R5a, contacts P2 to line 152. Relay R3 opens its contacts R3b to break the print clutch circuit but contacts P1 hold magnet 70 energized until the end of the cycle. Relay R3 also closes its contacts R3a to provide a holding circuit from line 151, relay R3, contacts R3a, constantly running contacts CR2 to line 152. As seen from Fig. 13, contacts CR2 close when contacts P2 are closed during the aforesaid print cycle and remain closed for the major part of the next cycle during which contacts CR5 close to energize the minor control relay R5 through the following circuit: from line 151, relay R5, relay R6, contacts CR5, contacts R3d (now closed) and wire 159 to line 152. Relay R6 closes its contacts R6a to provide a holding circuit from line 151, relay R5, R6, contacts R6a, contacts CF3, to line 152.

Relay R5 when energized remains so until contacts CF3 open during a card feed cycle. It opens its contacts R5a, R5c and R5d and closes its contacts R5b.

The start key may now be operated to close its contacts 157 so that, when contacts CR1 close near the end of the cycle, a circuit is completed from line 151, relays R7, R2, contacts 157, CR1, R4b, R5b (now closed) to line 152. Contacts R2a close to provide a holding circuit from line 151, relays R7, R2, contacts R2a and CF1 to line 152. Relay R7 closes its contacts R1a through which the card feed clutch magnet circuit is completed from line 151, magnet CF, contacts R7a to line 152.

The first card now commences to feed downwardly toward the set of upper brushes UB (Fig. 2) and during this cycle cam contacts CF3 open to drop the holding circuit of relay R6. However, at the time contacts CF3 open during this first card feeding cycle, there is a shunt path around them so their opening at this time has no effect and relay R6 remains energized.

Near the end of this first card feed cycle, contacts CF1 open to deenergize relays R7 and R2 and card feeding ceases. If the start key contacts 157 are held closed, or again closed, the relays R7 and R2 are immediately energized again as contacts CR1 close shortly after contacts CF1 open (see Fig. 13). Thus, a second card feed cycle will follow immediately after the first. The shunt circuit around contacts CF3 follows from contacts R6a, relay contacts LCLb, UCLc to line 152. The manner in which these contacts are controlled will be explained presently.

Just before the end of the first card feed cycle the leading edge of the first card engages the upper card lever 50 to close contacts 51 which thereupon complete a circuit through relay magnet UCL which in turn closes contacts UCLe to provide a holding circuit for the relay from line 151, relay UCL, contacts UCLe, and CR7 to line 152. The contacts CR7 alternate with contacts 51 to keep relay UCL energized as long as cards are feed to the brushes UB.

During the second card feed cycle, as the first card is advancing to the lower brushes LB, contacts UCLc are open so that, when contacts CF3 open during this cycle, relay R5 will become deenergized, causing in turn deenergization of relays R2 and R7 and magnet CF, thus interrupting further card feeding and leaving the first card in a position where its leading edge is just under the lower brushes LB and the leading edge of the second card is just under the upper brushes UB.

Just before the first card reached brushes LB, it closed contacts 52 to energize relay LCL which through its contacts LCLc and CR8 provide an alternate circuit to hold the relay energized during the interval between cards.

The foregoing cycles comprising a print cycle, a reset cycle and two successive card feed cycles are a necessary preliminary to advance cards into the machine when first starting. Adding operations are now ready to commence and in the following the machine will be described as set for tabulating.

*Automatic control circuits.*—The machine is provided with the usual automatic control devices which serve to keep the machine in operation as long as the control perforations on the successively fed cards are alike. This device may be disabled, however, so that operations continue as long as cards continue to feed. Disabling is effected by closing switch 158, whereby when relays R5 and R6 are initially energized and cards have reached the upper card levers, a holding circuit is established from line 151, relays R5, R6, contacts R6a, switch 158, contacts UCLb to line 152 through wire 159. Therefore, with contacts UCLa also closed the motor relay R7 and feed control relay R2 remain energized through a circuit from line 151, relays R7, R2, contacts R2a, UCLa, R4b and R5b to line 152. When the last card has passed the upper brushes and contacts UCLa open, as a consequence, the circuit through relays R7 and R2 is maintained for another cycle by contacts CF1 which shunt contacts UCLa, R4b and R5b and enable the last card to be advanced to pass the lower brushes LB for sensing of the data thereon.

AUTOMATIC CONTROL DEVICES

A brief description will now be given of the operation of the automatic control device to show how card feeding is automatically interrupted between card groups. After the four preliminary cycles explained above and with switch 172 previously opened, another print cycle is initiated by operation of the total key and the closure of contacts 156 as before and, as before, contacts P2 energize relay R3 which in turn causes relays R5 and R6 to become energized. If plug connections 160 and 161 have been made as indicated to the corresponding column of the upper and lower brushes and a plug connection 162 is also made, the machine will continue card feeding as long as the index positions of the selected card column of successive cards agree.

With card feeding restarted as before, a control circuit is traceable serially through the two cards passing the brushes as follows: from line 151, contacts CF4, contact roller 48, hole in the card, brush UB, connection 160, relay winding R9, connection 161, commutator 163, lower brush LB, contact roller 50, circuit breakers 164, lower card lever contacts 52 to line 152. Relay R9 closes its contacts R9a and R9b, the former setting up a holding circuit from line 151, relay R10, contacts R9a and CR6 to line 152 which is held until contacts CR6 open at the end of the cycle. Contacts R9b provide a shunt around contacts CF3 from the contacts through R9b, connection 162, contacts UCLb and wire 159 so that relays R5 and R6 remain energized and cards continue feeding.

When successive cards fail to agree, contacts R9b will not be closed when contacts CF3 open and interruption of card feeding will take place as set forth above.

*Adding circuits.*—For each column of the card which is to be added a plug connection such as 165 is made between a lower brush LB and a plug socket 166. Then as the card passes the lower brushes a circuit is completed at differential times, depending on the location of the hole to energize the accumulator winding AM. Assuming a "6" hole to be sensed, the circuit will be completed at the "6" time in the cycle, traceable from line 152, card lever contacts 52 (Fig. 14), circuit breakers 164, contact roller 49, "6" hole in the card, brush LB, commutator 163, plug connection 165 to socket 166 (Fig. 14a); contacts MCR3a, zero elimination commutator 167, contacts 116, 118, winding AM to line 151. This causes the accumulator wheel 104 to be started in motion resulting in the opening of contacts 116, 118 and closure of contacts 117, 119, the latter closing before the former open. A holding circuit for the winding AM is thus provided from line 151, winding AM, contacts 117, 119, contacts CR10 to line 152. Contacts CR10 open at the time indicated in Fig. 13 just before the stop cam 125 has caused interception of the accumulator wheel 104. Thus, the wheel is intercepted after it has moved six steps to add a "6."

*Tens carry.*—If during the entering part of the cycle a wheel has passed through zero it will have closed its tens carry contacts 136, 138 so that a carry circuit can now be completed from line 152 (Figs. 14 and 14a), contacts CR9, contacts 138, 136 of the units order for example, wire 169, carry commutator 168 of the tens order, winding AM of the tens order to line 151. The duration of the circuit is long enough to advance the tens wheel one step and no extra holding circuit is required. If the tens order stood at "9" at this time, the circuit would have continued from wire 169 through contacts 137, 136 of the tens order through the next higher wire 169 to the carry commutator of the hundreds order, the hundreds order winding AM and to line 151.

*Printing operations.*—When it is desired to have listing of the items entered as an accompaniment to the accumulating operations, switches 153 and 170 (Fig. 14) are closed, the former causing slower speed operation by cutting out resistance 154 and the latter placing the print clutch magnet 70 in parallel with the card feed clutch magnet CF so that magnet 70 is energized through the circuit from line 151, magnet 70, switch 170, contacts R2c and R7a to line 152. The type bars make a reciprocation during each card feeding cycle. If in the column from which adding takes place a plug connection such as 171 (Fig. 14a) is made, the adding circuit will branch from socket 166, through contacts MCR2a to plug connection 171, printing magnet PM and to line 151 so that the amount added is also listed. Obviously, if a connection is made directly from a lower brush to the magnet PM listing will take place independently of adding.

*Total printing operations.*—As explained above, the minor relay R5 will be deenergized when a group number change occurs and opening of contacts R5b will cause card feeding operations to stop with the first card of the new group at the lower brushes in readiness to traverse the same when card feeding resumes. If the automatic reset switch 172 (Fig. 14) is closed, a total printing cycle will follow immediately upon cessation of card feeding to print the amount or total standing on the accumulator. A circuit is completed when contacts R5c and R2b close traceable from line 151, print control relay R1, contacts R2b, switch 172, contacts R5c to line 152 resulting as before in energization of the print clutch magnet 70. As a consequence, the type bars begin to rise and contacts P1 close to shunt contacts R1a and R3b in the clutch circuit and keep the magnet 70 energized through the cycle and by breaking the circuit, take the arc.

With a switch 173 (Fig. 14, central left) closed as a preliminary, a circuit is traceable from line 151, contacts 74 (closed due to energization of magnet 70), contacts R5d (closed due to deenergization of relay R5), switch 173, contacts MCR1b, relay MCR2 to line 152. Relay MCR2 causes closure of its contacts MCR2b (bottom of Fig. 14) and opening of its contacts MCR2a so that the print magnet PM is now connected to the common readout segment 144 of the first readout section of each order through contacts MCR2b and plug connection 171. Total printing circuits can now be completed as follows: from line 152, circuit breakers 174 (Fig. 14), contacts R5f and R3h (now closed), common segment 175 of the "print" emitter PE, brush 176, segments 177 to impress impulses on the wires 178 in the order 9, 8, 7, etc., as the type bars present the correspondingly valued type to the platen, wire 178 to the readout segment 143 at which brush 142 is set, through the brush 142, segment 144, contacts MCR2b, plug connection 171, print magnet PM to line 151. In this manner the amount set on the accumulator readout devices is printed.

The emitter brush 176 may be amounted on the same shaft that carries the constantly running CR cams so that the brush is in constant rotation.

Near the end of the total printing cycle, contacts P2 (Fig. 14) close to cause energization of relay R3 as explained, which in turn through its contacts R3d causes energization of minor relay R5 and relay R6 during the next following cycle when contacts CR5 close. Thus, total printing will take two cycles during the first of which actual total printing takes place and relay R3 is energized. In the second cycle relay R5 is energized to open its contacts R5c and interrupt the circuit to print control relay R1.

*Automatic start circuit.*—If an automatic start switch 180 is closed, card feeding will automatically resume under control of contacts CR1 which close at the end of the reset cycle and establish a circuit from line 152, contacts R5b, R4b, CR1, and LCLa, switch 180, relays R2 and R7 to line 151. Relay R7 again causes energization of the card feed clutch magnet CF and, if switch 170 is closed, the print clutch magnet 70 is concurrently energized for listing the subsequently sensed cards.

*Resetting to zero operations.*—The accumulator shown herein is reset to zero by entering into the accumulator the nines complement of the amount standing therein under control of the second section of the readout device for the accumulator, and then adding "1" into the units order during the tens carry time to advance all the wheels from "9" to "0." It will be understood, therefore that resetting to "0" is acomplished by the tens complemental subtraction process. This resetting operation takes place during the second of the two total taking cycles and is effective when a reset switch 181 (Fig. 14) is closed. As previously explained, relay R3 is energized near the end of the total printing cycle and opens its contacts R3b to prevent the energization of the print clutch controlling magnet 70 so that the print clutch will not be engaged during the second, or what may be termed the reset cycle, and its contacts 74 are accordingly open during the reset cycle so that the relay MCR2 is deenergized.

Closure of the relay contacts R3f under control of relay R3 and the closure of contacts CR12 will complete a circuit from the line 151, contacts CR12, R3f, switch 181, relay magnet MCR3 to line 152. The energization of relay MCR3 will thereupon cause the opening of related contacts MCR3a for the units, tens and hundreds orders and the closure of its contacts MCR3b in the corresponding denominational orders.

Relay R3 also causes the closure of its contacts R3g (see bottom of Fig. 14) one blade of which is connected to the segment 182 (see top of Fig. 14a) of reset emitter RE. The brush 183 of the reset emitter RE is rotated by a shaft driven during resetting cycles and is adapted to successively contact segments 184 to transmit electrical impulses to a set of digit impulse transmitting wires 192 at times which are the nines complement of the digits involved. The first segment 184 contacted by the brush 183 will transmit an electrical impulse to the "9" digit impulse transmitting wire 192 at the "9" time in the resetting cycle. Thereafter, the brush 183 makes contact with the "8" segment 184 to transmit an electrical impulse to the "8" digit impulse transmitting wire 192 at the "8" time in the resetting cycle, and so forth. Thus, as the emitter brush 183 rotates circuits will be completed which are traceable from the line 152 (Fig. 14), circuit breakers 174 (Fig. 14), contacts R5f, R3g, segment 182 (Fig. 14a), brush 183, segments 184, to the wires 192. From Fig. 14a, it will be seen for each denominational order, that is, the units, tens, and hundreds order, there are wire connections from the digit impulse transmitting wires 192 to wires 193 which are connected to the segments 143 of the second section of the readout device of the accumulator. When the machine is adjusted so that the reset of the accumulator is effected to zero, there are normal electrical wire connections between the wires 192 and the wires 193 in nines complementary relationship so that the nines complemental electrical impulses will be transmitted to the segments 143 of the second section of the readout device for each denominational order of the accumulator. In this case, a series of magnets which are designated, for example, for the units order as 1u, 2u, 3u, 4u, and BA are deenergized at this time so that the electrical connections between digit impulse transmitting wires 192 and 193 in nines complementary relationship are effected through their lower normally closed contacts which are serially connected. Depending upon the position of the brush 142 of the second section of the readout device for the accumulator for each denominational order, a nines complemental electrical digit representing impulse will be transmitted to the segment 144 and from each segment 144 there is a related wire connection 194 to related contacts MCR3b, commutator 167, contacts 116, 118, winding AM, to line 151.

If, for example, the brush for the units order designated 142u2 is at the "1" position, as shown by dotted lines in Fig. 14a, an electrical impulse at the "8" time in the reset cycle will be transmitted by the connections just described through the winding AM of the units order thereby causing the clutch connection for the units accumulator wheel to effect the entry of "8" in this order, bringing the units accumulator wheel to a position to represent "9." By a similar operation the accumulator wheels of successive orders are rotated so as to receive the nines complement of the amount standing on the accumulator.

As previously described, upon the movement of each accumulator wheel 104, contacts 117, 119 (Fig. 14) will be closed to set up the holding circuit for the related winding AM. At the carry time, contacts CR9 close to complete a circuit from the line 152, contacts CR9, contacts MCR3c (now closed), the units order carry commutator 168 and units order winding AM, to line 151. This circuit also branches through the units order nines contact 137, 136, which are now closed, and thence to the windings AM of successive denominational orders to effect the addition of a unit to the accumulator wheel of each denominational order thereby advancing the accumulator wheels of all orders to zero.

*Stop key operation.*—Card feeding and printing may be interrupted at any time during their operation by depression of the stop key to close contacts 190 (Fig. 14) which cause energization of relay R4 when contacts CR3 close. Contacts R4a then set up a holding circuit through the normally closed start key contacts 157a and this circuit remains held until the start key is again operated. Relay R4 opens its contacts R4b breaking the holding circuit through relays R1 and R2 so these relays become deenergized when contacts CF1 open, resulting in the opening of contacts R1a to deenergize magnets CF and 70 at the proper time to stop the operations at the end of a cycle.

*List control switch.*—A multicontact relay MCR1 (Fig. 14) is provided which is energized due to closure of contacts R2c whenever cards are feeding and causes closure of the contacts MCR1a, during the period that the cards are passing the brushes. A switch 191 is provided which, when closed, will enable the completion of a circuit from line 151, contacts CR13, R5e, switch 191, contacts FCR1a, relay MCR2 to line 152. When this switch is closed, listing of the data sensed is prevented, even though the plug connections 171 are made, due to the fact that relay MCR2 causes opening of its contacts MCR2a so the circuit from the brushes LB cannot branch to the printing magnets PM. As explained hereinbefore, however, total printing circuits may be completed if switch 173 is closed to permit energization of relay MCR2 during a total cycle, in which case connection 171 is connected to the readout common 144 through contacts MCR2b.

*Paper spacing.*—The paper space magnet SP is energized each time the print clutch magnet 70 is energized and the circuit is traceable from line 151, magnet SP (Fig. 14), contacts 74a (closed by the armature of magnet 70), contacts CR17 to line 152. During total printing operations an additional impulse is given to magnet SP to obtain an extra space after the total. As explained above, there are two cycles following a group change during the first of which the total is printed and magnet SP is energized due to closure of contacts 74a. Also, during this cycle relay R3 is energized, closing its contacts R3f so that during the second or reset cycle, magnet SP may be energized again when contacts CR17 close and spacing again takes place.

SETTING ACCUMULATOR WHEELS TO PREDETERMINED AMOUNT WHICH IS POSITIVE

It has previously been described that the machine is provided with a resetting mechanism whereby the accumulator elements may be reset to "0" at the termination of a series of accounting operations. In certain types of accounting operations it is desirable that instead of resetting the accumulator wheels to "0" that such wheels be operated to receive an amount herein called the "initial entry or amount" and which entry or amount forms part of the subsequent accounting operations. To this end the present machine is provided with a selective arrangement comprising a manual setup device for causing the accumulator wheels to be reset to "0" or they may receive a subsequent entry. The setting up of the initial entry is preferably effected under control of the manual setup devices disclosed in Figs. 15a and 15b. In order to simplify the description, this operation of the machine will be explained in connection with only three denominational orders; the units, tens and hundreds orders. For manually setting up the predetermined amount, or initial entry, there is provided a series of three manually set wheels 200, a portion of which projects through slots formed in a cabinet cover. Each wheel is provided with a series of indicia which facilitate the setting up of the wheels so as to represent the predetermined amount, as will be seen from Fig. 15a.

To the wheels 200 of each denominational order, there is secured a plurality of brush assemblies 204, each brush being coordinated with related series of segments 202 and each brush assembly having a single common collector ring 203. From the above description and Fig. 15a it will be seen that each denominational order of the manual setup device comprises six sections, each section comprising a double readout, making twelve readouts, the brush assemblies of which are concurrently set under control of the related setup wheel 200. Each wheel is held in the position to which it is set by means of a spring pressed detent 201 which cooperates with the dentated periphery of the related wheel 200.

There has been previously described the resetting devices whereby the accumulator wheels may be reset to "0" by the tens complemental process comprising the addition of the nines complement to the amount standing on the accumulator plus the entry of the additional unit in the units denominational order to bring the accumulator wheels to "0." In carrying out the operation of the machine wherein the accumulator wheels instead of being set to "0" are set to a number predetermined by the setting of the wheels 200, it is preferable to utilize the same resetting mechanism but modifying its operation so that instead of the wheels being reset to "0," they will be set to the predetermined amount. Several examples will now be given explaining the principles of operation so that the operation of the mechanism involved, and which is to be later described will be more clearly understood.

Assuming, for example, that the accumulator is to be reset to "0," it will be recalled that this is effected by adding the nines complement of the amount standing in the accumulator, and later adding the additional unit in the units denominational order. This operation is outlined below:

```
0638   Amount standing in accumulator
9361   Nines complement of amount stand-
         ing in accumulator
----
9999
   1   Additional unit
----
0000
```

Assume, for example, that instead of resetting the accumulator wheels to "0" from –0638– such wheels should be set to represent –0013–. The principle wherein this is effected is outlined below:

```
0638   Amount standing in accumulator
         wheels
9361   Nines complement of amount stand-
         ing in accumulator
0013   Initial entry
----
0012
   1   Additional unit
----
0013   Initial entry on accumulator wheels
```

It will be noted that in the above computation –9361– and –0013– are added together. In the actual machine operation this is not the case. Under control of the setup device and accumulator it is determined that –9374– should be added instead of the amount –9361– to reset the accumulator to –0013–.

The operation of the machine for effecting the above problem involves the use of the reset emitter RE and the second section of the readout device associated with the accumulator shown diagrammatically in Fig. 14a. In the normal wiring relationship between emitter RE and the second section of the readout device of the accumulator shown in Fig. 14a, the nines complement of the amount standing in the accumulator is added to the amount in the accumulator and by the addition of the fugitive unit in the units denominational order the accumulator wheels are brought to "0." In setting the accumulator wheels to a predetermined amount the wiring relationship between the wires 192 and the wires 193 is altered and a new relationship is established between these wires under control of the manual setup device and the associated electrical setup devices. The relationship is so changed in each order that instead of bringing each accumulator wheel to "0," an electrical digit representing impulse is transmitted to the winding AM of each accumulator wheel, so as to bring the accumulator wheel to a position to represent the digit of the initial amount. The change in relationship between the second section of the readout devices of the hundreds order of the accumulator, for example, and the reset emitter RE is effected under control of the magnets 1h, 2h, 3h, 4h, and a carry operation magnet BC, BB or BA, for the hundreds, tens and units orders respectively, and such magnets are energized in accordance with the amount standing on the accumulator wheels and the setup of the wheels 200 which represent the initial entry. In order to more clearly understand the operation of the machine in carrying out the last-mentioned problem, it will be assumed in the following description that the accumulator wheel represents the amount –0638– and that such wheels are to be set so as to represent –0013–.

It is explained that the operation of the accumulator to receive the initial entry or amount is effected during the reset cycle of the accumulator, but previous to this cycle of operation, which is the total print cycle, there is a preliminary operation which is described herein as "determination of carry operations." These carry operations involve the reestablishment of the wiring connections between the reset emitter RE and the second readout section of the accumulators. While the operation of the machine involving the problem now under discussion does not require carry operations in the reestablishment of the wiring connections, a reference to this particular operation of the machine will now be generally given at this time so that a subsequent problem, which will be later explained, will be more clearly understood as the specification progresses. In the problem now to be described, the so-called carry determinations are not effected, but parts of the machine will nevertheless operate so as to determine that carry operations for the problem last selected will not be effected.

In the particular problem now under discussion it is assumed that the accumulator represents the amount –0638– and that such wheels are to be repositioned so as to represent –0013–. From what has been previously described, the repositioning of the accumulator wheels to indicate this initial entry is effected by the reestablishment of wiring connections between the reset emitter RE and the second readout section of the accumulator. Whether or not carry operations should be effected in the reestablishment of wiring connections in the different denominational orders is determined by the addition of the nines complement standing in the accumulator or –9361–, to the initial entry –0013–. This computation for the selected problem is represented below:

```
9361
0013
----
9374
```

As previously stated –9374– is the single amount entered in the accumulator to position the accumulator to the selected amount.

In the above computation the addition of 3 and 1 in the units order equals 4, and the addition of 1 and 6 in the tens order equals 7, so that neither in the units order, the tens order, nor for successive higher denominational orders will the carry be required in the reestablishment of wiring connections. The manner in which the machine is capable of determining whether or not carry operations are to be required will now be described.

During the total printing cycle, and before the resetting cycle is initiated, cam contacts P5 (Fig. 14c) close thereby extending a circuit from the line 152 through cam contacts P5 to a wire 206 and through the normally closed contacts AA2 (Fig. 14b) to the common collector ring 203t9 for the tens order. In the example assumed for the tens order the digit of the initial entry –0013– comprises the digit "1" and therefore the brush assembly 204t9 is in the "1" position making a circuit connection from common collector ring 203t9 to the related "1" segment 202t9 thereby extending the circuit to a relay 1Dt, the other side of the relay being connected by a wire 207 to the other line side 151. The closure of the circuit just described will cause the energization of the relay 1Dt and effect the closure of its relay contacts 1Dt2 and such contacts will be retained closed as long as cam contacts P5 remain closed. It will be recalled that in the tens order of the amount –0638– standing on the accumulator the digit is "3" and, therefore, the brush of the third section of the readout of the accumulator will be at the dotted line position shown in Fig. 14b, the brush being designated by the reference numeral 142t3, and said brush making contact with its common collector segment 144t3. In the position of the brush under discussion it will be seen that due to the particular wire connection from the "3" segment 143t3 a circuit will not be closed from the last mentioned collector segment 144t3 through the brush to the relay contacts 1Dt2, thus permitting a circuit which is normally open to be retained open when contacts P6 close after contacts P5 have already been closed. This open circuit extends from the line 152 through contacts P6, wire 208 to relay contacts 1Dt2, the circuit being open at this point as has just been explained. If the circuit had been closed at this point the circuit would have been extended from wire 208 through one of the closed contacts 1Dt0 to 9, through the brush 143t3 to the common segment 144t3 and to a hundreds carry determination relay magnet BC, which is connected to the other line side 151. It will be apparent, therefore, that the hundreds carry determination relay magnet BC will not be energized and a similar determination is effected for the units order as will now be described.

The circuit extends, as previously described, from the line 152, to cam contacts P5 to the wire 206 (Fig. 14b) through the normally closed AA3 contacts to the common segment 203u9. In the problem selected the digit of the initial entry in the units order is "3" and therefore, in the ninth section of the readout device for the units order of the manual setup device, the related brush assembly 204u9 will be set (as shown) to make contact with the "3" segment 202u9 thereby causing the energization of the relay magnet 3Du, the other side of this magnet being connected to the wire 207 which is connected to the line side 151.

The energization of the magnet 3Du will cause the closure of its contacts 3Du1 thereby continuing the circuit from the "3" segment 202u9 to the relay magnet 2Du, the latter thereupon being energized to cause the closure of its contacts 2Du1 which, in turn, cause the energization of the relay magnet 1Du. The energization of the relays 3Du, 2Du and 1Du will cause the closure of the respective contacts 3Du2, 2Du2 and 1Du2 but none has a wire connection to the "8" segment 143u3 which is contacted by the related brush 142u3 which is at the "8" position (as shown) because the units digit of the amount standing in the accumulator or –0638– comprises the digit "8." For this reason the circuit from the wire 208 will not be closed through the relay contacts 1Du2, 2Du2, and 3Du2 to the brush 142u3, thereby keeping the circuit to this carry determination magnet BB open when cam contacts P6 close. The machine is, therefore, capable of determining that carry operations will not be effected in either the units or tens order in the operation of the machine which causes the change in the accumulator representation from °0638– to the initial entry –0013–. Later on a problem will be described in which such carry determinations are required and made. By providing the above description this particular operation will be more clearly understood when that part of the specification involving this particular problem is presented.

In the problem under discussion, it is assumed that the initial entry in the accumulator is to be changed from the amount standing thereon or –0638– to –0013–. It will also be recalled that the manual setup device is set up in the units, tens and hundreds order to set the brush assemblies of the readout devices associated with the manual setup device to represent –0013–. From Fig. 14c, it will be noted that for each denominational order, for example, the hundreds order, a series of relays designated 1h, 2h, 3h, and 4h is provided, the relay contacts of which change the wiring relationship between the digit impulse transmitting wires 192 and the related sets of wires 193. The change in the wiring relationship between the wires 192 and 193 is effected in accordance with the selective energization of the relays. The selective energization of the relays 1, 2, 3, and 4 for each of the different denominational orders is placed under control of the manual setup device and by means of the associated readout devices thereof in a manner which will now be explained in detail.

Considering a single denominational order, the hundreds order, for example, it will be seen that there is associated with each magnet a double readout device only one of which is in use at a time. To make this clearer, it will be seen that the relay magnet 4h, as an example, has branch wire connections to the common collector rings 203h8 and 203h7 of the double readout device associated with the relay magnet 4h. It will be evident that magnet 4h may be energized by means of the electrical contact between the related brush assembly 204h8 and the associated segments 202h8 for one readout section and by means of the other readout section by contact between one of the segments 202h7 and the related brush assembly 204h7. Considering the double readout device now referred to, it will be seen that some of the segments 202h8 are connected to a wire 212 and furthermore some of the segments 202h7 are connected to a wire 215.

For each denominational order some of the segments associated with the even numbered readout sections are connected to the wire 212 while some of the segments of the odd numbered sections are connected to the wire 215. In the repositioning of the accumulator from the amount standing thereon to an initial entry, and which amount is positive, the even numbered sections of the readout device are utilized and, since the initial entry is to be positive in the problem under discussion, the even numbered sections of the readout device are selected by the positioning of the switch blade 205b of a switch 205 to the position shown in Fig. 14c. This will effect a wire connection from the wire 212, through the switch blade 205b to cam contacts CR16 to relay contacts R3k to the line side 152. It will be recalled that the relay R3 is energized during the reset cycle and during the accumulator entry time cam contacts CR16 are also closed, so as to hold the energization of the relays 1, 2, 3, and 4 which have been selected for energization in the different denominational orders.

The manner in which the last-mentioned sets of relays are selectively energized by the manual positioning of the different sections of the readout device under control of the manual setup device will now be explained in connection with the particular problem now under discussion. It will be remembered that the manual setup device is positioned to represent the initial entry or "0" in the hundreds order, "1" in the tens order, and "3" in the units order. Considering the hundreds order, the even numbered brush assemblies 204h2, 4, 6, and 8 will be positioned to make contact with the "0" segments of the sets 203h2, 4, 6 and 8. It will be seen from Fig. 14c that the "0" segments of the last-mentioned sets are not connected to the wire 212 and, therefore, when relay contacts R3k and contacts CR16 are closed, none of the relays 1h, 2h, 3h, and 4h will be energized. With particular reference to Fig. 14a, the relays 1h, 2h, 3h, and 4h will remain in their normal deenergized positions so as to permit the normal wiring relationship between the wires 192 and the wires 193 connected to the segments 143h2 of the second section of the readout device associated with the accumulator. In the tens order the even numbered brush assemblies 204t2, 4, 6 and 8 are positioned so as to make contact with the "1" segment of the related set of segments 202t2, 4, 6 and 8, and only the "1" segment of the set 202t2 has an electrical wire connection to the wire 212. It will be evident that in the tens order, when contacts CR16 close and relay contacts R3k close, the circuit will be closed to the magnet 1t, the magnet 1t being connected to the other line wire 151, as is also true for each magnet 1, 2, 3, and 4 of the different sets.

In the units order the even numbered brush assemblies 204u2, 4, 6 and 8 will be positioned to represent "3" and will make contact with the "3" segment of the related sets of segments 202u2, 4, 6 and 8, and only the brush assembly of the third section, which is designated 204u6, makes contact with the "3" segment to close the circuit between the line 212 of the relay magnet 3u, thus causing the energization in the units order of the relay magnet 3u.

Summarizing, in the problem under discussion, the relay magnets 3u and 1t will be energized and the energization of these relay magnets will cause, as will be subsequently explained in detail, the repositioning of the accumulator from the amount standing thereon or –0368– to the initial amount –0013–.

In general, it is explained that depending upon the digits represented by the setting of the manual setup device one or more of the relay magnets 1, 2, 3 and 4 in the different denominational sets are selectively energized. In accordance with the different setups of the manual setup devices different relay magnets are energized and in order to be able to determine which of these relays are effective for other problems their energization is effected in accordance with the following table:

TABLE NO. 1

| Digits represented on manual setup devices | Relays effective in each set |
|---|---|
| 0 | None |
| 1 | 1 |
| 2 | 2 |
| 3 | 3 |
| 4 | 4 |
| 5 | 1, 4 |
| 6 | 2, 4 |
| 7 | 3, 4 |
| 8 | 1, 3, 4 |
| 9 | 2, 3, 4 |

It will be recalled that with the amount of –0638– standing on the accumulator, the reset to zero is effected by the entry of the tens complement thereof, or –9362–, this number being the nines complement –9361– plus the fugitive unit. In repositioning the accumulator to represent the initial entry –0013–, the entry of –9374– should be made so that a change in the entry for the units and tens denominational orders is made to cause the accumulator wheels to represent the desired amount –0013–. The manner in which this is performed for the present problem will now be explained.

Referring to Fig. 14a, it will be seen that, since the accumulator in the hundreds order represents "6" of the number –0638– the brush assembly 142h2 in the hundreds order of the second section of the readout device of the accumulator will be positioned (as shown in dotted lines) to make contact with the "6" segment 143h2. This will extend a circuit from the related wire 194 which leads to the winding AM of the hundreds denominational order to the collector ring 144h2, the brush assembly 142h2, the "6" segment 143h2, and the wire 193 which is connected to the last-mentioned segment. It will be recalled that for the hundreds order the relays 1h, 2h, 3h and 4h remain deenergized and the circuit extends, therefore, through the lower closed relay contacts 1hg, 2hg, 3hg, 4hg, BCg to the "3" impulse transmission wire 192. At the "3" point in the entry cycle an electrical impulse will be transmitted to the winding AM of the hundreds denominational order causing the engagement of the accumulator clutch and the rotation of the accumulator wheel for three steps thereby turning the accumulator wheel from its previous "6" digit representing position to the "9" digit representing position. It is also understood that for the thousands order (while not shown), since the accumulator wheel represents "0," the entry of "9" will be effected in the same manner as for resetting operations.

Considering now the tens denominational order, it will be recalled that in such order the relay *It* is energized, the energization of this relay causing the opening of all the lower relay contacts and the closure of all the upper relay contacts. Since the accumulator wheel in the tens order represents "3" the brush 144t2 is at the "3" digit representing position as shown in Fig. 14a. This will effect the circuit connections from the wire 194 leading from the tens order winding AM to the common collector segment 144t2, the brush assembly 142t2, the "3" segment 143t2, the related wire 193 connected thereto, thence to the following relay contacts; upper relay contacts *Itc*, now closed, lower relay contacts 2tc, 3tc, 4tc and BBc to the "7" digit impulse transmitting wire 192. At the "7" point in the entry cycle the winding AM of the tens denominational order will be energized thereby rotating the related accumulator wheel seven steps repositioning the accumulator wheel from the previous "3" digit representing position to the "0" representing position.

In the units denominational order, it will be recalled that the relay 3u is energized and in a similar manner a circuit is closed from the wire 194 leading from the units denominational order winding AM to the common collector segment 144u2, the brush 142u2 which is now at the "8" digit representing position, the "8" segment 143u2, to the wire 193 connected thereto and thence through the following lower closed relay contacts *Iui*, 2ui, to the upper closed relay contacts 3uf, since relay 3u is energized, thence to the lower closed relay contacts 4uf, BAf, to the "4" digit impulse transmitting wire 152. At the "4" point in the entry cycle the units denominational order, winding AM will be energized causing the engagement of the clutch of the units accumulator wheel thereby turning the accumulator wheel four steps from the "8" digit representing position to the "2" digit representing position. Before units carry operations are effected in the accumulator the accumulator wheels will represent –9902–. Obviously, since in the units order the addition of "8" and "4" brings the units accumulator wheel through "0" a unit will be carried to the tens order bringing such accumulator wheel to the "1" digit representing position. In the similar manner, transfers are effected for the hundreds and thousands denominational order. At the end of the units carry operations the accumulator will represent –0012–.

As has been previously described in connection with resetting operations, the machine is provided with mechanism for causing the insertion of the fugitive unit in the units order. This, as previously explained is effected under control of the cam contacts CR9 and relay contacts MCR3c which effect the transmission of a unit through the units order commutator 168 to the units order winding AM. This will cause the entry of an additional unit in the units order thereby changing the accumulator representation from –0012– to –0013–. The last-mentioned number represents the initial entry in the accumulator and is utilized in connection with successive accounting operations.

In the problem previously under consideration, it was explained that although the machine went through a cycle of operation in which determination of carries was effected carries were not actually made. To illustrate the use of the carry determining mechanism, there will now be considered a problem in which a carry is effected in one denominational order. While actual carry operations may be effected in other higher denominational orders, it is believed that the operation of this mechanism for all the required denominational orders will be understood by explaining the arrangement for a single denominational order and in the present example this is described for the tens denominational order.

For further simplification it will be assumed that the accumulator representation is –0638– as previously assumed, but in the present example the accumulator is to be repositioned from a representation of the last amount to a different initial entry or –0029–. The determination of carry operations is, as previously explained, governed and determined by the addition of the nines complement of the amount standing on the accumulator to the amount of the initial entry. In the example under consideration this computation is as follows:

9361 Nines complement of amount on accumulator
    0029 Initial entry
    ----
    9380 Without carry operations
       1 Units carry in tens order
    ----
    9390 After units carries are effected From the above it is seen that the entry of the amount –9380– in the accumulator should in the problem above be changed to –9390–.

From the above, it will be seen that a carry is necessary in the tens denominational order under control of the units order. With particular reference to Fig. 14b for the units denominational order, since the manual setup device for the units order represents "9" which is the units of the initial entry –0029–, the brush 204u9 will be positioned to contact with the "9" segment 202u9. This will cause the energization of the relay 9Du causing the closure of both contacts 9Du1 and 9Du2. Since the accumulator represents "8" in the units order –0638– the brush 142u3 will be at the "8" digit representing position (as shown), thereby extending the circuit through the lower closed relay contacts 9Du2 to the brush 142u3, to the common segment 144u3, and thence to the relay magnet BB, causing the energization of the latter. The energization of relay magnet BB closes its stick contacts BB10, connecting relay magnet BB to the line 152 through relay contacts R3m and wire 211. Contacts R3m remain closed during the cycle in which the accumulator is repositioned from one representation to another.

Thus, it will be seen that for each denominational order the predetermination of carries is under conjoint control of the accumulator readout and the readout set by the manual setup device. Since the amount standing in the accumulator may vary in magnitude, it will be understood from the foregoing that carry predetermination operations are effected according to digit representations which may vary in magnitude in each order of the accumulator readout device and the readout device of corresponding order of the manual setup device. With particular reference to Fig. 14b, it is pointed out that in each order the criss-cross wiring between the lower "2" relay contacts of the D relays and the segments 143 of the related order of setup device is so arranged as to cause the energization of the relay magnets BB and BC to effect carry operations in accordance with the relative magnitudes of the digits standing on the accumulator wheel and the digits represented by the settings of the manual setup device. In order that other problems may be followed out and the circuit connections for different reentering operations be understood, there is presented below Table No. 2 which indicates when carry operations are effected for different combinations of digits represented on the accumulator wheel and the manual setup device.

TABLE NO. 2

*Combinations of digits in corresponding orders of the manual setup device and accumulator which require carry operations in repositioning accumulator for positive amount*

| Digit representation on accumulator wheel | Normal reset impulse | Digit standing on manual setup device |
|---|---|---|
| 0 | 9 | 1 |
| 1, 0 | 8, 9 | 2 |
| 2, 1, 0 | 7, 8, 9 | 3 |
| 3, 2, 1, 0 | 6, 7, 8, 9 | 4 |
| 4, 3, 2, 1, 0 | 5, 6, 7, 8, 9 | 5 |
| 5, 4, 3, 2, 1, 0 | 4, 5, 6, 7, 8, 9 | 6 |
| 6, 5, 4, 3, 2, 1, 0 | 3, 4, 5, 6, 7, 8, 9 | 7 |
| 7, 6, 5, 4, 3, 2, 1, 0 | 2, 3, 4, 5, 6, 7, 8, 9 | 8 |
| 8, 7, 6, 5, 4, 3, 2, 1, 0 | 1, 2, 3, 4, 5, 6, 7, 8, 9 | 9 |

There will now be explained the manner in which the machine operates for the repositioning of the accumulator wheels from the amount standing thereon –0638– to –0029–, the present explanation taking into consideration the reestablishment of the digit impulse transmitting circuits and particularly the manner in which they are controlled in the tens order by the carry relay BB. Since it has been assumed that the amount standing on the accumulator has not been changed from the preceding problem and still represents –0638–, the positions of the brushes 142 of the second section of the accumulator readout device shown in Fig. 14a are unchanged.

In the units denominational order the brush assembly 142u2 is at the "8" digit representing position and, since the initial entry in the units order is to represent 9, the units order accumulator wheel should be positioned from the "8" digit representing position to the "9" digit representing position. Referring to the preceding Table No. 1 which outlines the particular relays which are to be effective in accordance with the settings of the manual setup device, it is to be noted that for the representation of the digit "9" relays 2, 3, and 4 are energized and, therefore, for the units denominational order relays 2u, 3u and 4u are energized. The circuit controlled by the corresponding contacts extends in part from the brush 142u2 at the "8" digit representing position, the "8" segment, the associated wire 193, the normally lower closed relay contacts 1ui, the upper closed relay contacts 2ug, the upper closed relay contacts 3ud, the upper closed relay contacts 4uj and to the normally open upper relay contacts BAi and, since such contacts are open, it will be seen that in this case no impulse will be transmitted to the winding AM of the units accumulator wheel and the latter will remain at the "8" digit representing position.

With respect to the tens denominational order, from Table No. 1 the setting of the manual setup device of the tens denominational order to represent "2" will cause the energization of the relay magnet 2t which will cause a circuit to be closed from the brush 144t2, the "3" segment, the associated wire 193, normally closed relay contacts 1td, the upper closed relay contacts 2tb, the normally closed relay contacts 3tb, normally closed lower relay contacts 4tb, to the upper relay contacts BBa now closed, to the "9" impulse transmitting wire 192. This will cause the energization of the tens accumulator winding AM at the "9" point in the cycle thus causing the rotation of the accumulator wheel nine steps to turn the tens accumulator wheel from the "3" digit representing position to the "2" digit representing position, it being understood that during this operation of the wheel the latter passes through "0."

In the hundreds denominational order it is necessary to position the wheel from "6" to "0" and this operation is effected by adding to "6" the nines complement or the digit "3." The circuit for effecting this entry is from the brush 142h2 at the "6" digit representing position to the following normally closed relay contacts 1hg, 2hg, 3hg, 4hg, BCg, to the "3" digit impulse transmitting wire 192. This will cause the accumulator wheel of the hundreds order to turn from "6" to "9."

In the thousands order a "0" is represented and in this order "9" will be added to the thousands order accumulator wheel turning the latter to the "9" digit representing position. At the termination of the above entry operations, the accumulator wheel will represent –9928–.

Since the tens denominational order accumulator wheel has gone through "0" in passing from "3" to "2," a transfer will be effected to the hundreds order, and from the hundreds order to the thousands order causing the accumulator wheel to finally represent –0028–. As previously described at the termination of the entry operations, a fugitive unit is entered in the units order accumulator wheel causing it to represent "9." At the termination of the fugitive unit entry operations the accumulator wheel will represent –0029– which is the initial entry to be used in subsequent accounting operations.

From Fig. 14a it is noted that cam contacts CF5 are interposed between the sections of the lines 152. These contacts are normally closed so that during total print cycles carry predeterminations may be made, but during listing cycles contacts CF5 open to prevent carry predeterminations from being made during listing cycles, thereby preventing unnecessary energizations of relays, if such would be effected.

*Carry by carry operations.*—Concurrently with the operation of the machine which involves the determination of the requirements for carry operations, it is also necessary to ascertain whether a column exists in which a carry is to be made which is the result of a carrying operation of a lower denominational order. This means, of course, that a change in the wiring relationship of one order may be controlled by the result of a computation in a lower order. To make this clearer it is pointed out that in one denominational order, for example, the tens order, some of the digits may sum up to "9" and due to a carry operation in the units denominational order the tens denominational order will have a carry made thereto. This carry operation is transmitted to the next higher or thousands denominational order so that it also may receive a carry operation.

In the problem previously under consideration, this condition or requirement did not exist and to understand the operation of this particular part of the machine a problem will be selected which requires its use. The problem now to be considered is the repositioning of the accumulator from the amount standing thereon or –0638– to a new amount or initial entry comprising the number –0039–. Other combinations of numbers may, of course, require use of this part of the machine and it should be understood that the present problem is merely illustrative. For simplification it is also assumed that the amount standing on the accumulator is the same as the previous amount.

The determination of carry by carry operations is also governed and determined by the addition of the nines complement to the amount standing on the accumulator to the amount of the initial entry. In the example now under consideration this computation is as follows:

```
9361  Nines complement of amount on ac-
         cumulator
0039  Initial entry 9390  Before carries by carries are effected
   1  Carry by carry from units order

9400
```

From the above it will be seen that in the tens order the digits "3" and "6" equal "9." Due to the fact that a carry has been effected from the units order to the tens order the digit "9" is changed to "0" and accordingly a transfer is effected to the hundreds order.

Since the units denominational order of the manual setup device represents "9" the brush 204u9 is in contact with the "9" segment 202u9 and, since the units order of the accumulator represents "8," the brush 142u3 is, as shown, in contact with the "8" segment 143u3 as before. The relay 9Du will be energized closing its contacts 9Du1 and 9Du2 thereby closing, as previously stated, the circuit to the relay magnet BB.

In the tens order the manual setup device is set to represent "3" and the brush 204t9 is in contact with the "3" segment 202t9 thereby causing the energization of the relay 3Dt and the closure of its contacts 3Dt1 and 3Dt2. Since in the tens order the accumulator represents the digit "3" the brush 142t3 is in contact with the "3" segment 143t3 but, since there is no electrical connection between the last-mentioned segment and the relay contacts 3Dt2, the relay magnet BC will not be energized. However, the energization of the relay magnet BC is effected by the following described means.

For carrying out determination of carries by carries the manual setup device is provided in the tens and hundreds denominational order with a supplemental readout section (Fig. 14b, at the left), the elements of which are identified by the reference numeral "11." In the tens order in both the accumulator and manual setup device, "3" is represented thereon so that the brush 204t11 is in contact with the "3" segment 202t11. The brush 142t4 is also in contact with the "3" segment 143t4, both of these brushes being shown in such positions in Fig. 14b. It will be seen that there is a wire connection between the "3" segments of both readout devices thereby closing a circuit described as follows: from the collector segment 144u3, previously described as being connected to line 153, a branch wire connection through contacts P8 and from said contacts to the normally upper closed relay contacts AA5 to the common collector segment 203t11, through the brush 204t11, the "3" segment 202t11, then to the "3" segment 143t4 by an interconnecting wire, the brush 142t4, the common collector segment 144t4, contacts P7 to the relay magnet BC, to the line 209, to the line 151. This will cause the energization of the relay magnet BC and the latter will close its stick contacts BC10 and such contacts will remain closed during the entry cycle which causes the repositioning of the accumulator wheels.

The problem now under consideration involves the repositioning of the units order accumulator wheel from the digit "8" to the digit "9" of the initial entry. This is precisely the same as in the problem previously under consideration and the manner in which the units order accumulator wheel is operated will not be repeated at this time.

Similar to the last problem under consideration, the tens order accumulator wheel represents "3" but differentiating from the last problem the manual setup device is set to represent "3" which is the tens digit of the initial entry. It will also be recalled, noting particularly Table No. 2, that for the setting of the manual setup device to represent "3," relay 3 will be energized and, therefore, for the tens denominational order relay 3t is energized. Referring particularly to Fig. 14a, the operating circuit extends from the "3" segment 143t2, the related wire 193, lower relay contacts 1td, lower relay contacts 2td, upper relay contacts 3ta, now closed due to the energization of relay magnet 3t, lower relay contacts 4ta and lower relay contacts BBa which are now open due to the energization of the relay magnet BB as previously described. This will cause the opening of the circuit from the "9" digit impulse transmitting wire 192 and, therefore, for the tens order no impulse will be transmitted and the accumulator wheel will remain at its normal position representing the digit "3."

With respect to the hundreds denominational order, it will be recalled that the magnet BC is energized and this has been energized in accordance with the requirement to effect a carry by carry operation in the hundreds denominational order which was derived under control of the mechanism which determined that a carry should be effected in this denominational order under control of the tens denominational order. The operating circuit for the hundreds denominational order will now be described, the circuit extending from the "6" segment 143h2, the related wire 193, lower relay contacts 1hg, 2hg, 3hg, and 4hg, the upper relay contacts BCf, which are now closed due to the energization of the relay BC, thence to the "4" digit impulse transmitting wire 192. In the thousands denominational order the accumulator represents "6" and at the "4" point in the operating cycle the hundreds order accumulator wheel will be rotated thereby driving the latter four steps to bring the hundreds order accumulator wheel so that it represents "0." In the thousands denominational order the accumulator wheel is operated so as to represent "9" which is the nines complement of the digit "0." The units carry operation from the hundreds denominational order accumulator wheel will be effected to the thousands denominational order accumulator wheel thereby changing the representation of the latter from "9" to "0."

After the last mentioned operation, the entry of the fugitive unit is made in the units denominational order changing the representation from "8" to "9." The accumulator will now represent –0039– which is the amount of the initial entry.

In order that other problems may be followed out and the circuits controlling the energization of the relay magnets BB or BC understood, there is presented below a table designated Table No. 3, showing under what conditions carry by carry operations are to be effected for different digit representations of the accumulator and of the manual setup device.

TABLE No. 3

*Different digit representations of accumulator and of manual setup devices which require "carry by carry" operations for repositioning accumulator for positive amounts*

| Accumulator wheel digits | Resetting impulse | Manual setup device representations |
|---|---|---|
| 0 | 9 | 0 |
| 1 | 8 | 1 |
| 2 | 7 | 2 |
| 3 | 6 | 3 |
| 4 | 5 | 4 |
| 5 | 4 | 5 |
| 6 | 3 | 6 |
| 7 | 2 | 7 |
| 8 | 1 | 8 |
| 9 | 0 | 9 |

In explanation of the above, if it is assumed that the accumulator wheel represents "0" the normal resetting impulse will cause the digit "9" to be added thereto. The accumulator wheel will thereupon represent "9." If there is an entry in the same order this particular order will be in condition to require a carry to the next higher denominational order. In the second line, it is assumed that the accumulator wheel is at "1" which necessitates the normal resetting impulse to add "8" thereto bringing the accumulator representation to "9." If there is an entry in this same denominational order a condition exists which will require a carry by a carry, or a carry operation to the next higher denominational order.

REPOSITIONING OF ACCUMULATOR TO REPRESENT A PREDETERMINED NEGATIVE AMOUNT

From the above it is apparent that the accumulator may be positioned to represent an initial entry which is positive, equal to, greater than, or less than the amount represented on the accumulator, after one or more transaction entries have been effected and the machine is conditioned for a resetting operation for the accumulator.

As previously stated in some methods of accounting it is desirable to represent the initial entry as a negative amount, that is, an amount which is to be deducted from subsequent transactions. These negative amounts may be entered, as is well known, either by the reverse rotation of the accumulator wheels or by the entry of the tens complement of the amount to be deducted, the latter being disclosed herein as it is preferable.

The change of the machine to reposition the accumulator to represent a negative amount is under control of the switch 205, the latter being set from the position shown in Fig. 14c so that switch blade 205b is in contact with the contact point connected to the wire 215. The switch blade 205a is also shifted so as to be in contact with the contact point connected to the relay magnet AA. The circuit for the latter is from wire 152, through contacts P4, switch blade 205a, relay magnet AA to wire 151. Relay magnet AA closes its relay contacts AA1, AA2, AA3, AA4, AA5, AA6, AA7.

In the entry of a negative amount the determination of carries, or as previously stated, a possible change in the reestablishment of the wiring connection is effected by the energization of the relay magnets BD, BC, BB and BA, and other readout sections associated with the manual setup device are selected, and which will be referred to when found necessary.

The closure of normally open AA1 contacts connects wire 206 to the common segment 203h10. The closure of normally open AA2 contacts connects wire 206 to the common segment 203t10 and the closure of normally open AA3 contacts connects wire 206 to the common segment 203u10. Thus the tenth readout sections associated with the units, tens, hundreds orders of the manual setup device are selected for carry determination operations for negative entries, instead of the ninth readout sections which are used for positive amounts. Hence, the "D" sets of relays are energized under control of the setting of the brush assemblies 204u10, 204t10, 204h10.

The opening of the normally closed AA4, AA5 relay contacts disconnects the eleventh sections of the readout devices controlled by the manual setup devices for the hundreds and tens order, respectively, and selects the twelfth sections thereof. Hence, the determination of a carry by a carry in the operation of the machine for entering negative amounts controlled by magnets BD and BC is controlled by the twelfth sections of the tens and hundreds readout devices.

For units carry operations controlled by relay magnet BA the latter is also called into operation for negative entries. When relay contacts AA7 close the energization of relay magnet BA is placed under control of the twelfth section of the units readout device associated with the manual setup device, and the fourth section of the units readout device of the accumulator.

The closure of relay contacts AA6 also places the energization of relay magnet BA under control of cam contacts P6, the circuit being from line 152, contacts P6, wire 208, contacts AA6, magnet BA, wire 209 to line 151.

The positioning of blade 205b (Fig. 14c) to the right places the wire 215 in circuit connection with contacts CR16 and R3k, and this selects for each denominational order the odd numbered readout sections, which select for energization the related sets of relays 1, 2, 3 and 4, according to a predetermined plan.

In accordance with the requirement that the accumulator wheels be positioned to represent the tens complement, relays 1, 2, 3 and 4 are energized according to following table:

TABLE No 4

| Digits represented on manual setup devices | Relays effective in each set |
|---|---|
| 0 | 2, 3, 4 |
| 1 | 1, 3, 4 |
| 2 | 3, 4 |
| 3 | 2, 4 |
| 4 | 1, 4 |
| 5 | 4 |
| 6 | 3 |
| 7 | 2 |
| 8 | 1 |
| 9 | None |

In order that the operation of the machine for repositioning the accumulator wheels to represent a negative amount may be more clearly understood, a specific problem will be selected and explained in connection with the arrangement shown herein, and in which operation substantially all of the devices are utilized.

In the problem under discussion it is assumed that the amount represented on the accumulator is –0250– and that the accumulator is to be repositioned to represent the amount –0639– as a negative number and which is set up on the manual setup device as a positive number. Since negative numbers are represented herein as complements, the accumulator should represent –9361– the tens complement of –0639–.

In accordance with Table No. 3, the setting of the manual setup device to represent –0639– will cause the energization of the following relay magnets, units-none; tens, 2t, 4t; hundreds, 3b, thousands, 2th, 3th, 4th.

As previously stated, the shifting of contacts AA3 will select the units tenth readout section of the manual setup device. Since this represents "9," brush 204u10 is in contact with the "9" segment. The latter is not wired to any relay magnet of the related set –Du– and, therefore, none is energized.

The shifting of the AA2 contacts will select in the tens order the tenth readout section of the manual setup device. Since this represents "3" brush 204t10 is in contact with the "3" segment 202t10 of the related readout section. A wire connection is made from the "3" segment to the relay magnet 6Dt causing its energization and closure of contacts 6Dt1, which causes relay 5Dt to be energized, and thus in succession all of the lower ordered relay magnets Dt are energized. Hence relay magnets 6Dt to 1Dt are energized and they close their relay contacts 6Dt2 to 1Dt2.

The accumulator in the tens order is set to represent "5" and, therefore, brush 142t3 is in contact with the "5" segment. Due to the relative set up of brushes 142t3 and 204t10, a circuit will be closed from the line 152, contacts P6, wire 208, contacts 6Dt2, "5" segment 143t3, brush 142t3, common segment 144t3, relay magnet BC, wire 209 to line 151.

In the hundreds order a circuit is completed from shifted AA1 contacts to common segment 203h10, brush 204h10 at the "6" position, the "6" segment 202h10, relay magnet 3Dh, and wire 207 to line 151. As previously explained, the interconnection of the relay magnets and their contacts causes all relay magnets of lower order, 3Dh, 2Dh, and 1Dh to be energized and their related contacts 3Dh2, 2Dh2 and 1Dh2 to be closed. However, in the hundreds order no circuit is completed to magnet BD because brush 142h3 is at the "7" position and no circuit is completed to any of the relay contacts 3Dh2, 2Dh2 and 1Dh2.

Summarizing the above, relays 2t, 4t, 3h, 2th, 3th, 4th are energized to control reestablishment of accumulator operating circuits and relay magnet BC is also energized to make another change in the reestablishment of the operating circuits for the hundreds order.

In the particular problem under consideration, this step is necessary because in the tens order of the accumulator, "5" is represented and the nines complement thereof is "4." In the tens order of the manual setup device "3" is represented and the nines complement thereof is "6." The resultant sum of both nines complement is "10," indicating the necessity of a carry in the hundreds order.

In order that other problems may be understood particularly in the determination whether the carry control magnets BD, BC, or BB are energized, the following table should be referred to:

TABLE No. 5

*Combination of digits in corresponding orders of the manual setup device and accumulator which require carry operations in repositioning accumulator for negative amount*

| Digit representation on accumulator wheel | Normal reset impulse | Setup subtracting value | Digit standing on manual setup device |
|---|---|---|---|
| 8, 7, 6, 5, 4, 3, 2, 1, 0 | 1, 2, 3, 4, 5, 6, 7, 8, 9 | 9 | 0 |
| 7, 6, 5, 4, 3, 2, 1, 0 | 2, 3, 4, 5, 6, 7, 8, 9 | 8 | 1 |
| 6, 5, 4, 3, 2, 1, 0 | 3, 4, 5, 6, 7, 8, 9 | 7 | 2 |
| 5, 4, 3, 2, 1, 0 | 4, 5, 6, 7, 8, 9 | 6 | 3 |
| 4, 3, 2, 1, 0 | 5, 6, 7, 8, 9 | 5 | 4 |
| 3, 2, 1, 0 | 6, 7, 8, 9 | 4 | 5 |
| 2, 1, 0 | 7, 8, 9 | 3 | 6 |
| 1, 0 | 8, 9 | 2 | 7 |
| 0 | 9 | 1 | 8 |
|  |  | 0 | 9 |

Applying the present problem, since the setting on the manual setup device represents "3" and the accumulator represents "5" in the tens order, the above table indicates the requirement of a carry operation in the hundreds order. If the accumulator wheel represented 4, 3, 2, 1 and 0, a carry would still be required but, if it represented 9, 8, 7, or 6, there would be no requirement for a carry.

Concurrently with the determination of carry operations it is also necessary to determine whether in a particular order the sum represents "9" and upon a carry being made in this order, a carry is effected to the next higher order, and which operation is designated as a "carry by a carry."

In the problem under consideration such a condition exists in the units order. In the units order the digit representation in the accumulator is "0" of the number –250– and the nines complement is "9." In the units order of the manual setup device the digit representation is "9" of the number –639–. The nines complement thereof is "0." The algebraic summation of these two nines complement is, of course "9." It will be shortly shown that a unit carry is applied to this order, and since the summation is now "0," a "carry by a carry" is effected to the tens denominational order. The means for determining carry by carry operations and the means for effecting such operations will now be described by reference to the particular problem under consideration.

The carry to the units order is effected because it is necessary to effect the entry as a tens complement and in the present arrangement the fugitive unit entry device is utilized. This circuit extends from the line 152, through contacts P6, wire 208, shifted AA6 contacts now closed, to relay magnet BA, wire 209 to wire 151. This energizes relay BA which closes its stick contacts BA10 to hold the energization of relay BA during accumulator entry operations. The energization of relay BA will, referring to Fig. 14a, cause the closure of its relay contacts BAa to BAi inclusive.

The electrical impulse transmitted to relay magnet BA is also directed by a branch circuit through relay contacts AA7 to the common segment 203u12 of the twelfth readout section of the units order associated with the manual setup device, thus rendering this section effective for the determination of a "carry by a carry." The brush 204u12 is at the "9" digit representing position and brush 142u4 is at the "0" representing position because "9" is the units of the accumulator representation of the number −639−, and "0" is the units of the manual setup representation of the number −250−. There is a wire connection between the "9" segment 202u12 and the "0" segment 143u4, thus closing a circuit from the line side 152, cam contacts P6, wire 208, relay contacts AA7, segment 203u12, "9" segment 202u12, to the "0" segment 143u4, common segment 144u4, P8 contacts, relay magnet BB, wire 209 to line 151. Relay magnet BB causes closure of its stick contacts BB10.

Summarizing, it will be observed that in the problem now under consideration all of the relay magnets BC, BB, BA are energized and the manner in which they control the selection of the accumulator operating circuits will later be explained.

In order that determinations of "carry by carry" operations may be understood for other problems, the following table indicates the particular digit representations which require such operations:

TABLE No. 6

*Different digit representation of accumulator and of manual setup devices which require "carry by carry" operations for repositioning accumulator for negative amounts*

| Accumulator wheel representing digits | Normal resetting impulse | Subtracting digit impulse for manual setup digit | Manual setup device representations |
|---|---|---|---|
| 9 | 0 | 9 | 0 |
| 8 | 1 | 8 | 1 |
| 7 | 2 | 7 | 2 |
| 6 | 3 | 6 | 3 |
| 5 | 4 | 5 | 4 |
| 4 | 5 | 4 | 5 |
| 3 | 6 | 3 | 6 |
| 2 | 7 | 2 | 7 |
| 1 | 8 | 1 | 8 |
| 0 | 9 | 0 | 9 |

Applying the present problem, the digit representation on the manual setup device is "9" and on the accumulator is "0." Hence, a condition exists in which this would create a carry to a next higher order if a units carry is transmitted to the order involving the summation of "9" and "0."

Relay R3 is energized during the latter part of the total printing cycle and closes its relay contacts R3k (Fig. 14c) and R3m (Fig. 14b) and the latter close before contacts P4, P5, P6, P7, P8 open, thus causing the energization of the relay magnets BA, BB, BC for carry by carry determinations. These relays cause their respective stick contacts, designated by the reference numeral 10, to close the respective stick circuit extending from each stick contact to the wire 211, through contacts R3m, to the line wire 152, and thus the last-mentioned magnets remain energized during the greater part of the cycle in which the accumulator is repositioned to the selected amount.

Recapitulating, the positioning of the switch blade 205b to make contact with the contact point to which the wire 215 is connected selects the odd numbered readout sections associated with the manual setup device and in accordance with the setting of the manual setup device to represent the initial entry, the closure of relay contacts R3k and cam contacts CR16 cause the energization of the selected relays 2t, 4t; 3h; and 2th, 3th, and 4th.

There will now be explained the manner in which the wiring relationship between the reset emitter RE and the second section of the readout of the accumulator is established and which, as previously described, is under control of the selected relays 1, 2, 3, and 4 of each denominational order and the respective carry magnets BA, BB and BC. It will be recalled that in the problem under consideration the representation of the accumulator is −0250−. This number may represent a positive amount or it may be the result of a subtracting operation and even represent a negative number as a complement. This number representation on the accumulator is thereby changed to represent the number −639− as a negative number or by the tens complement −9361−.

In the units order of the accumulator the brush 142u2 is at the "0" position and, therefore, in contact with the "0" segment 143u2, thereby closing the accumulator operating circuit to the related wire 193, thence through lower relay contacts 1ua now closed, lower 2ua contacts now closed, lower 3ua contacts, lower 4ua contacts, and BAa contacts which are now open as a result of the energization of the carry determination magnet BA. This will open the operating circuit for the units order accumulator wheel and, since the units wheel is at "0," it will remain at "0."

With reference to the tens order, the brush 142t2 is at the "5" digit representing position and, therefore, in contact with the "5" segment 143t2 thereby extending the circuit to lower relay contacts 1tf, upper relay contacts 2td now closed, lower relay contacts 3td, upper relay contacts, 4tj and upper relay contacts BBi, and thence to the "1" impulse transmitting wire 152. This will cause the operation of the tens order accumulator wheel one step thereby turning it from the "5" position to the "6" digit representing position.

With reference to the hundreds denominational order, the brush 142h2 is at the "2" digit representing position thereby extending the circuit to lower closed relay contacts 1hc, 2hc, upper closed relay contacts 3hj, lower relay contacts 4hj, upper relay contacts BCi to the "1" impulse transmitting wire, thereby causing the operation of the hundreds order accumulator wheel one step bringing it from the "2" digit representing position to the "3" digit representing position.

With reference to the thousands denominational order, while the operating circuits are not shown, the operating circuits are the same as in other orders, and in the present problem brush 142th2 is at the "0" digit representing position thereby closing the circuit which extends through lower relay contacts 1tha, upper relay contacts 2thi, upper relay contacts 3thj, upper relay contacts 4thb, upper relay contacts BDa, to the "9" impulse transmitting wire 192. This will cause the thousands order accumulator wheel to be rotated nine steps bringing the accumulator wheel from the "0" digit representing position to the "9" digit representing position.

At the termination of the accumulator entry operation the accumulator wheels will represent −9360−. As previously described, the units order accumulator wheel receives the entry of a fugitive unit, thus positioning the wheel to represent "1" and, after such operation has been effected, the accumulator wheel will represent –9361–. This is the tens complement of the amount represented on the manual setup device –639–. This negative amount when added to subsequent positive amounts will effect the deduction of the amount –639– therefrom.

Attention is directed to the fact that when the tabulating machine of the Lake and Pfaff patent is adjusted for listing operations, the shaft 72 (Fig. 4) also makes one revolution during each card feed cycle. It is, therefore, unnecessary that carry predeterminations be made during each listing cycle. Cam contacts CF5 are closed during total printing cycles to permit predetermination of carries, and such contacts are open during listing cycles to prevent such predeterminations from being made.

While there has been shown and described and pointed out the fundamental novel features of the invention as applied to a single modification, it will be understood that various omissions and substitutions and changes in the form and details of the device illustrated and in its operation may be made by those skilled in the art without departing from the spirit of the invention. It is the intention therefore to be limited only as indicated by the scope of the following claims.

What is claimed is:

1. In a machine of the class described, the combination of an accumulator positionable to represent an amount, entering means for said accumulator comprising actuating means for each order, means comprising a set of digit impulse transmitting circuits for each denominational order of the accumulator, a source means for transmitting digit representing electrical impulses to said circuits to cause in each order through an impulse transmitting circuit the operation of the corresponding actuating means, amount representing means settable to an amount to which said accumulator is to be repositioned and means controlled jointly by said settable amount representing means and said accumulator for selecting, for each order of the accumulator and in accordance with the digital representation of the settable means and the related order of the accumulator, digit impulse transmitting circuits from the sets of circuits to cause the actuating means to set up in the accumulator the amount represented by said settable means under control of said selected circuits.

2. In a cyclically operable accounting machine, in which a reset cycle automatically follows one or more item entering cycles, said accounting machine including an accumulator provided with rotatable accumulator elements for receiving and totalizing entries effected during the item entering cycles, positioning means for said elements, manually settable means settable prior to the reset cycle operation to represent zero or a predetermined amount, means for causing under control of said manually settable means and said accumulator elements the operation of the positioning means to position said accumulator during the reset cycle operation to represent an amount corresponding to the digit setting of said settable means, and means to automatically effect a reset cycle of the machine after one or more item entering cycles and to effect the operation of said last named means during the reset cycle of machine operation.

3. In a cyclically operable accounting machine, in which a reset cycle automatically follows one or more item entering cycles, said accounting machine including an accumulator provided with elements for receiving and totalizing entries effected during the item entering cycles, means for effecting the actuation of said elements at differential times, manually settable means settable prior to the reset cycle operation to represent zero or a predetermined amount, means for causing under control of said manually settable means and said accumulator elements the operation of the first named means at differential times which will position said accumulator elements during the reset cycle operation to represent an amount corresponding to the digit setting of said settable means, and means to initiate and to effect the operation of said last named means during the reset cycle of machine operation.

4. In a cyclically operable accounting machine, in which a reset cycle automatically follows one or more item entering cycles, said accounting machine including an accumulator provided with accumulator elements for receiving and totalizing entries effected during the item entering cycles, settable means settable prior to the reset cycle operation to represent zero or a predetermined amount, means under control of said settable means and said accumulator elements to control the positioning of said accumulator elements during the reset cycle operation to represent the tens complement of the amount predetermined by said settable means, and means to initiate and to effect the operation of said last named means during the reset cycle of machine operation.

5. In an accounting machine, rotatable accumulator wheels each of which is differentially rotated from a zero position to a differential position to represent a digit of an amount, rotating means for said wheels, amount representing means settable for representing zero or digits of an amount, means to initiate the operation of said rotating means to effect the rotation of said wheels at differential times in an actuating cycle, and means controlled by said amount representing means when the latter represents a number other than zero and said accumulator wheels to cause said initiating means to control the operation of said rotating means at differential times determined by the digit representing positions of said amount representing means and said wheels, to thereby cause rotation of the latter to digit representing positions corresponding to digit positions of said amount representing means.

6. In an accounting machine, an accumulator positionable to represent an amount, actuating means for each order of said accumulator, means comprising impulse transmitting circuits and a source means of differentially timed digit representing impulses for said circuits for causing in each order of the accumulator through an impulse transmitting circuit the operation of the corresponding actuating means, amount representing means settable to an amount to which said accumulator is to be repositioned, and means under control of said amount representing means and said accumulator for selecting, for each order of the accumulator and in accordance with the digital representation of the settable means and the related order of the accumulator, digit representing impulses from said source means which will cause through said impulse transmitting circuits the operation of the actuating means to set up in the accumulator the amount represented by the settable means.

7. In an accounting machine, an accumulator having elements positionable from a digit representing position to represent a predetermined amount as a negative number, positioning means for said accumulator elements, amount representing means settable to represent said predetermined amount, and means controlled by said settable means and said accumulator elements and in accordance with the digit representing position of said accumulator and the amount represented by said settable means to control said positioning means to cause the latter to reposition said accumulator elements from said first named digit representing positions to digit representing positions representing a tens complement of the amount predetermined by the setting of said amount representing means.

8. In a cyclically operable accounting machine, in which a reset cycle automatically follows one or more item entering cycles, said accounting machine including an accumulator provided with rotatable accumulator elements for receiving and totalizing entries effected during the item entering cycles, positioning means for said elements, settable means settable to represent zero or a predetermined amount, means for causing under control of said settable means and said accumulator elements the operation of the positioning means to position said accumulator during the reset cycle operation to represent an amount corresponding to the digit setting of said settable means, and means to automatically effect a reset cycle after one or more item entering cycles and to effect the operation of said last named means during the reset cycle of machine operation.

9. In a calculating machine, the combination of an accumulator positionable to represent an amount, actuating means for each order of said accumulator, devices coordinated with the accumulator and set in accordance with the digit representation of each order of the accumulator, means for emitting digit representing impulses one for each digit of a notation, amount representing means settable in each order to represent digits of an amount to which said accumulator is to be repositioned, and means under joint control of said settable means and said devices to select and transmit for each order of the accumulator a digit representing impulse from said emitting means to the actuating means of that order which will cause the operation of the actuating means to set up on the related accumulator order the digit represented by the same order of the settable means.

10. In a calculating machine, the combination of an accumulator having elements positionable to receive and represent an amount, actuating means for effecting the actuation of the elements of each order of said accumulator at differential times, devices coordinated with the accumulator elements and set in accordance with the digit representation of the related element of the accumulator, means for emitting differentially timed digit representing impulses one for each digit of a notation, amount representing means settable to represent digits of an amount to which said accumulator elements are to be repositioned, and means under joint control of said settable means and said devices to select and transmit for each order of the accumulator a differentially timed digit representing impulse from said emitting means to said actuating means of that order which will cause the operation of the actuating means at a differential time to set up on the related accumulator element the digit represented by the same order of the settable means.

ARTHUR H. DICKINSON.